United States Patent
Dudar et al.

(10) Patent No.: US 10,968,852 B2
(45) Date of Patent: Apr. 6, 2021

(54) SYSTEMS AND METHODS FOR FUEL FILTER DIAGNOSTICS

(71) Applicant: Ford Global Technologies, LLC, Dearborn, MI (US)

(72) Inventors: Aed Dudar, Canton, MI (US); Thomas Leone, Ypsilanti, MI (US); Kenneth Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 15/921,605

(22) Filed: Mar. 14, 2018

(65) Prior Publication Data
US 2019/0285020 A1    Sep. 19, 2019

(51) Int. Cl.
| F02D 41/22 | (2006.01) |
| F02M 37/22 | (2019.01) |
| F02M 37/08 | (2006.01) |
| F02M 37/00 | (2006.01) |
| F02D 41/14 | (2006.01) |
| F02M 65/00 | (2006.01) |
| B01D 29/90 | (2006.01) |
| B01D 29/66 | (2006.01) |
| B01D 35/00 | (2006.01) |

(Continued)

(52) U.S. Cl.
CPC ............ *F02D 41/22* (2013.01); *B01D 29/66* (2013.01); *B01D 29/902* (2013.01); *B01D 35/005* (2013.01); *F02D 41/003* (2013.01); *F02D 41/1454* (2013.01); *F02M 37/0076* (2013.01); *F02M 37/08* (2013.01); *F02M 37/22* (2013.01); *F02M 65/003* (2013.01); *F02M 65/007* (2013.01); *F02D 2041/224* (2013.01); *F02D 2200/0602* (2013.01); *F02M 25/08* (2013.01)

(58) Field of Classification Search
CPC .... F02D 41/22; F02D 41/003; F02D 41/1454; F02D 41/38; F02D 41/3809; F02D 41/3836; F02D 41/3845; F02D 41/3863; F02D 2041/224; F02D 2200/0602; F02D 2041/225; F02D 2041/226; F02D 19/0615; B01D 29/66; B01D 29/902; B01D 35/005; F02M 37/0076; F02M 37/08; F02M 37/22; F02M 65/003; F02M 65/007; F02M 65/00; F02M 25/08
USPC ................ 701/29, 105, 103, 112; 73/114.43, 73/114.48, 114.51
See application file for complete search history.

(56) References Cited

U.S. PATENT DOCUMENTS 5,633,458 A * 5/1997 Pauli ....................... F02D 41/22
                                                         701/105
7,140,354 B1 * 11/2006 Hashemi ............... F02D 19/022
                                                          123/456

(Continued)

*Primary Examiner* — Richard A Goldman
(74) *Attorney, Agent, or Firm* — Geoffrey Brumbaugh; McCoy Russell LLP

(57) ABSTRACT

Methods and systems are provided for controlling a fuel system of a vehicle to diagnose whether a fuel filter is functioning as desired. In one example, a method may include, in response to a fuel rail pressure decreasing below a threshold pressure while an engine of the vehicle is running, diagnosing whether degradation of fuel injectors or a fuel pressure regulator of the vehicle has occurred while the engine is not running. Then, only if degradation of the fuel injectors and fuel pressure regulator has not occurred, a fuel filter cleaning routine is performed.

18 Claims, 8 Drawing Sheets

(51) Int. Cl.
*F02D 41/00* (2006.01)
*F02M 25/08* (2006.01)

(56) References Cited

U.S. PATENT DOCUMENTS

| | | | | |
|---|---|---|---|---|
| 7,874,281 | B2* | 1/2011 | Delp | F02D 41/009 |
| | | | | 123/446 |
| 8,104,334 | B2* | 1/2012 | Wang | F02D 41/222 |
| | | | | 73/114.43 |
| 8,919,325 | B2* | 12/2014 | Pursifull | F02D 41/0025 |
| | | | | 123/458 |
| 2006/0054149 | A1* | 3/2006 | Uchiyama | F02D 41/222 |
| | | | | 123/676 |
| 2010/0108029 | A1* | 5/2010 | Rollinger | F02D 41/22 |
| | | | | 123/350 |
| 2010/0307454 | A1* | 12/2010 | Ulrey | F02D 19/027 |
| | | | | 123/445 |
| 2011/0023833 | A1* | 2/2011 | Chamarthi | F02M 53/00 |
| | | | | 123/464 |
| 2012/0143480 | A1* | 6/2012 | Pursifull | F02D 19/0615 |
| | | | | 701/105 |
| 2013/0013174 | A1* | 1/2013 | Nistler | F02M 59/366 |
| | | | | 701/112 |
| 2014/0109882 | A1* | 4/2014 | Hoegl | F02B 37/12 |
| | | | | 123/559.1 |
| 2014/0353262 | A1* | 12/2014 | Troxler | B01D 29/66 |
| | | | | 210/791 |
| 2016/0153388 | A1* | 6/2016 | Sanborn | F02D 41/3854 |
| | | | | 123/458 |
| 2017/0030281 | A1* | 2/2017 | Willis | F02D 41/22 |
| 2018/0327249 | A1* | 11/2018 | Dudar | F02M 25/0872 |
| 2019/0285020 | A1* | 9/2019 | Dudar | F02M 37/22 |

* cited by examiner

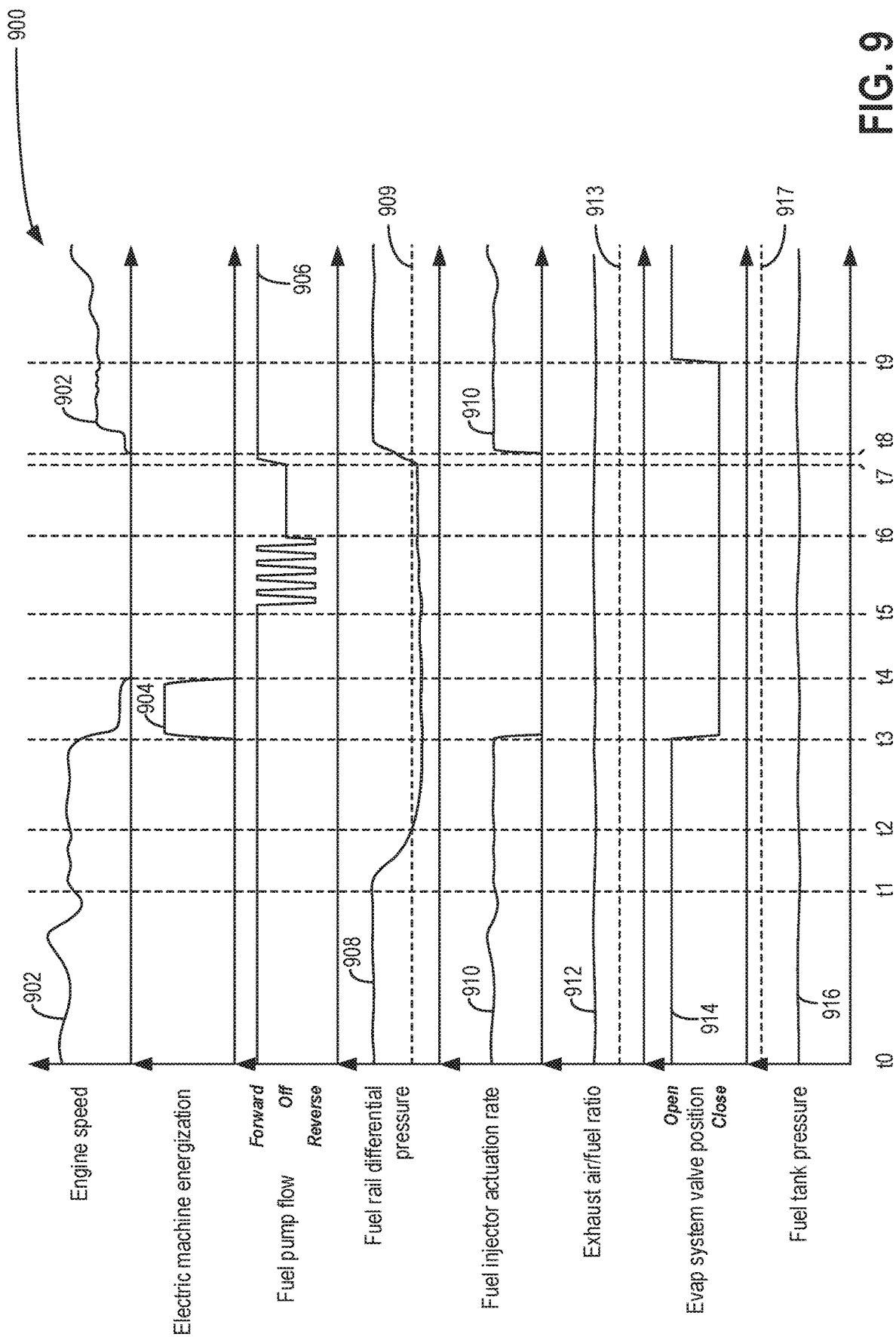

SYSTEMS AND METHODS FOR FUEL FILTER DIAGNOSTICS

FIELD

The present description relates generally to methods and systems for controlling a fuel system of a vehicle to diagnose whether a fuel filter is functioning as desired.

BACKGROUND/SUMMARY

Fuel systems for vehicles including an internal combustion engine often include several components configured to adjust a flow of fuel from a fuel tank of the vehicle to the engine. For example, fuel may flow the fuel tank to one or more fuel rails of the engine, with a pressure of the fuel being adjusted by a fuel pressure regulator. Fuel disposed within the fuel rails may be at a higher pressure than fuel stored within the fuel tank, and the fuel in the fuel rails may be injected into cylinders of the engine via one or more fuel injectors coupled to the fuel rails. However, degradation of components of the fuel system may result in reduced fuel rail pressures and decreased engine performance.

Attempts to address degradation of fuel system components includes performing various tests to attempt to identify degradation of the fuel system components. One example approach is shown by Willis et al. in U.S. Publication 2017/0030281. Therein, a system is disclosed including a controller configured to determine if degradation is present in a fluid system based on a first pressure decay rate of the fluid system, and responsive to identifying that degradation is present in the fluid system, differentiating between an internal and external degradation based on a flow rate as fluid system pressure decreases.

However, the inventors herein have recognized potential issues with such systems. As one example, during conditions in which the fuel rail pressure is decreased due to a fuel filter of the fuel pump being clogged or otherwise degraded, systems such as those described by the '281 publication may mistakenly attribute the decrease in fuel rail pressure to a non-existent degradation in the fuel system. Further, diagnosis of the fuel filter is often difficult, and identifying degradation of the fuel filter often requires removal of one or more components of the fuel system, such as the fuel tank, for a lengthy and/or labor-intensive visual inspection.

An approach to addressing degradation of a fuel filter is shown by Troxler in U.S. Publication 2014/0353262. Therein, a method and system for removing contaminants from a filter member positioned on the inlet of a fuel pump with an electric DC motor is disclosed. A polarity of a motor control circuit is reversed, causing the DC motor to run in reverse and discharging residual fuel in the fuel pump through the filter member. However, the inventors herein have additionally recognized potential issues with such systems. As one example, reversing the polarity of the motor may result in degradation of other fuel system components and/or reduced engine performance if the fuel filter is not correctly diagnosed as being clogged or otherwise degraded. For example, reversing the polarity of the motor during conditions in which degradation is present in the fuel system may result in an increased degradation and/or increased entrainment of atmospheric air into fuel flowing to the fuel tank via the pump.

In one example, the issues described above may be addressed by a method, comprising: responsive to an engine fuel rail pressure decreasing below a threshold pressure, determining degradation of any of a plurality of engine fuel system components including a fuel injector, a fuel regulator, and a fuel line coupled to a fuel pump; and responsive to determining that degradation of any of the plurality of engine fuel system components has not occurred, adjusting operation of the fuel pump to perform a fuel filter cleaning routine. In this way, a reliability of diagnosing fuel filter degradation may be increased, and the fuel filter may be cleaned to increase engine performance without degradation of the engine and/or fuel system components.

As one example, determining degradation of the fuel system components includes, responsive to an engine key-off request, driving the engine unfueled for a duration while monitoring an air/fuel ratio in an exhaust passage, and sealing an engine evaporative emissions canister of the vehicle while monitoring a fuel vapor pressure within a fuel tank of the vehicle. If the air/fuel ratio is above a threshold air/fuel ratio and the fuel vapor pressure is below a threshold vapor pressure, an electronic controller of the engine determines that degradation of the fuel filter has occurred and pulses fuel through the fuel pump in forward and reverse directions to clean the fuel filter. In this way, degradation of the fuel filter may be diagnosed without visual inspection and/or removal of components from the vehicle, and the fuel filter may be cleaned without resulting in degradation of the engine and/or fuel system components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7-9 each show graphs illustrating various different engine operating parameters during diagnosis of degradation of fuel system components of a vehicle.

DETAILED DESCRIPTION

Figure 4:
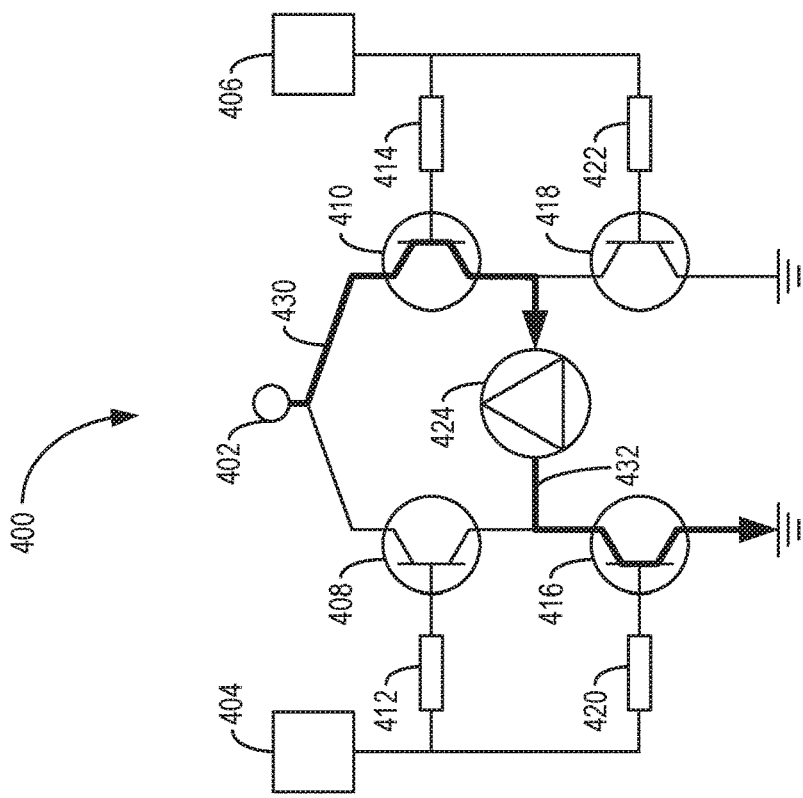
FIGS. 3-4 each schematically show an electrical circuit configured to supply power to a vehicle fuel pump, with FIG. 3 illustrating a first mode of the circuit, and with FIG. 4 illustrating a second mode of the circuit.

The following description relates to systems and methods for diagnosing degradation of fuel system components of a vehicle. A vehicle, such as the vehicle shown by FIG. 1, includes an engine configured to receive fuel from a vehicle fuel system including a fuel tank and a fuel pump. The fuel pump may be disposed within a fuel delivery module of the fuel tank, such as the fuel delivery module shown by FIG. 2. The fuel pump is coupled to a power source of the vehicle via an electric circuit, as shown by FIGS. 3-4, with the electric circuit configured to enable the fuel pump to operate with forward and reverse pumping directions.

Figure 5:
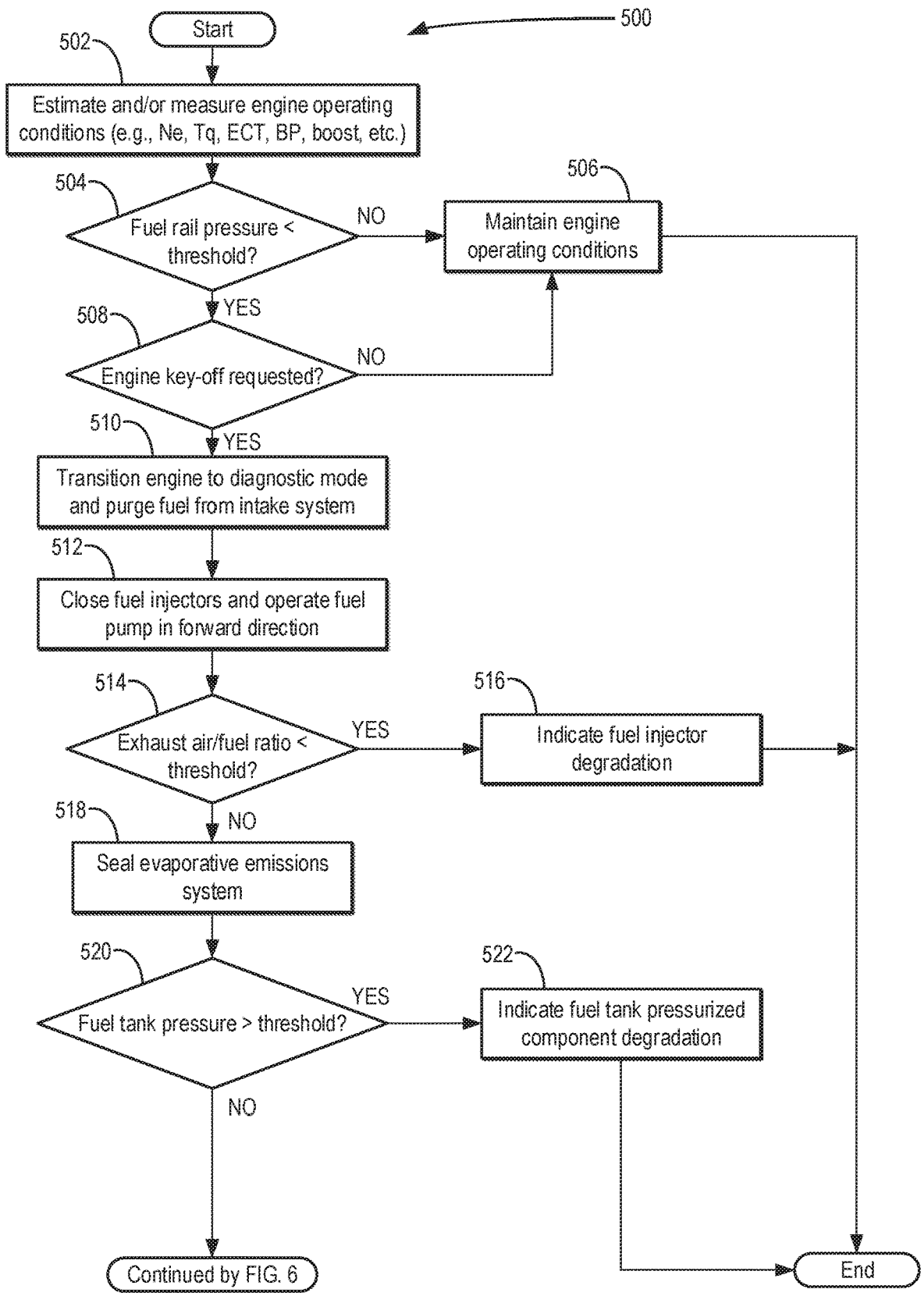
FIGS. 5-6 each show a flow chart illustrating a method for diagnosing degradation of fuel system components of a vehicle.
Figure 6:
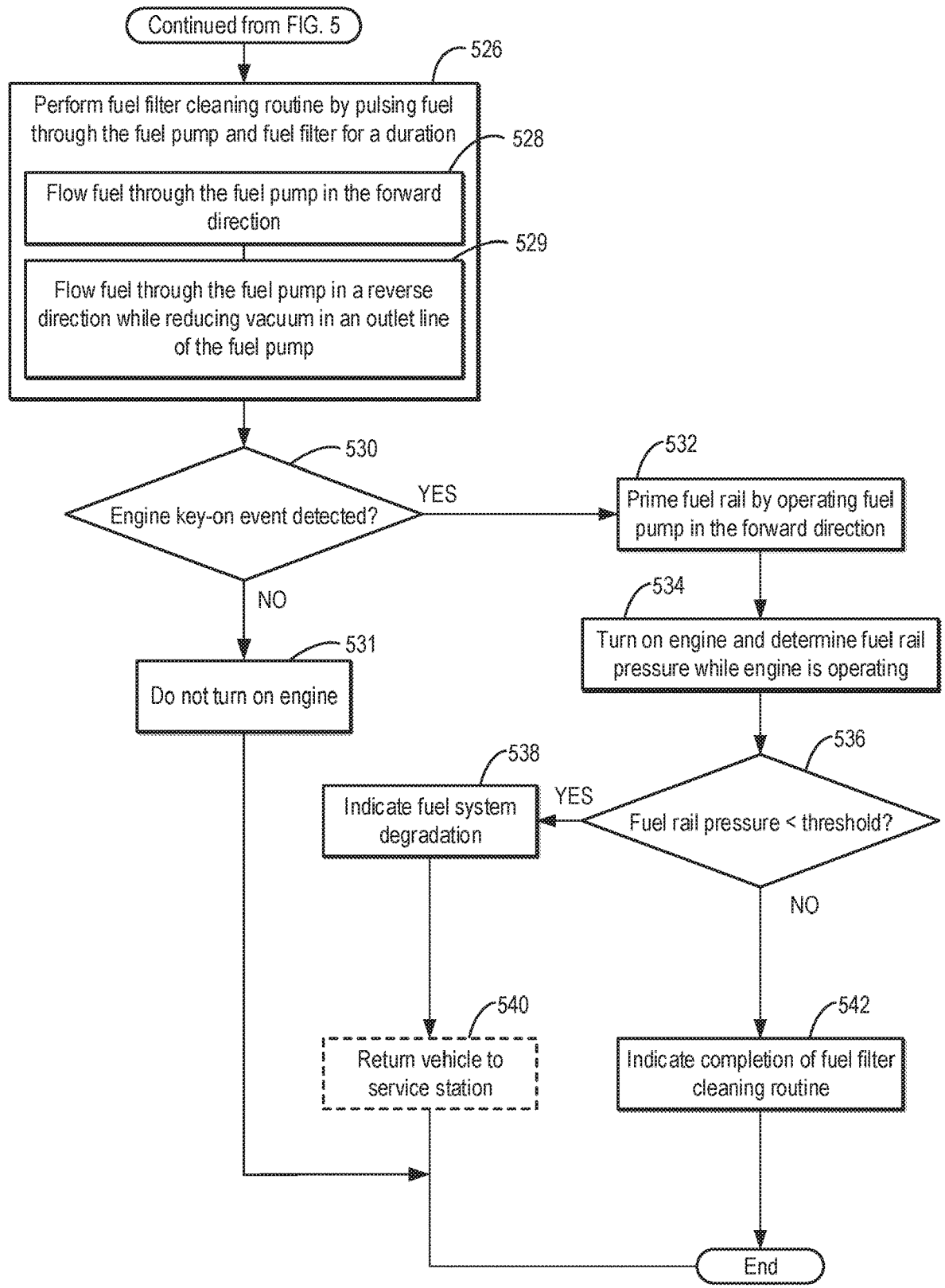
Figure 7:
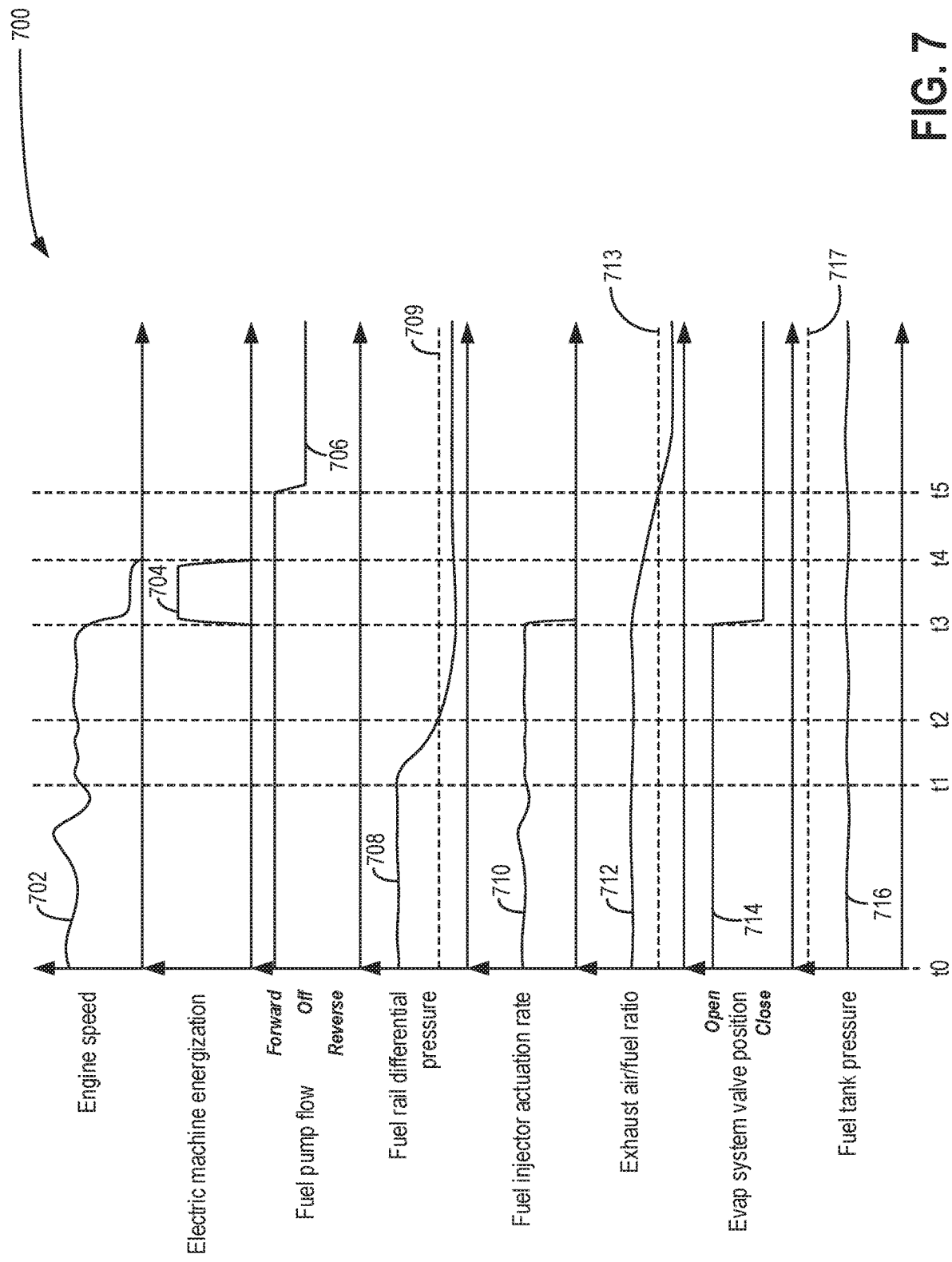
Figure 8:
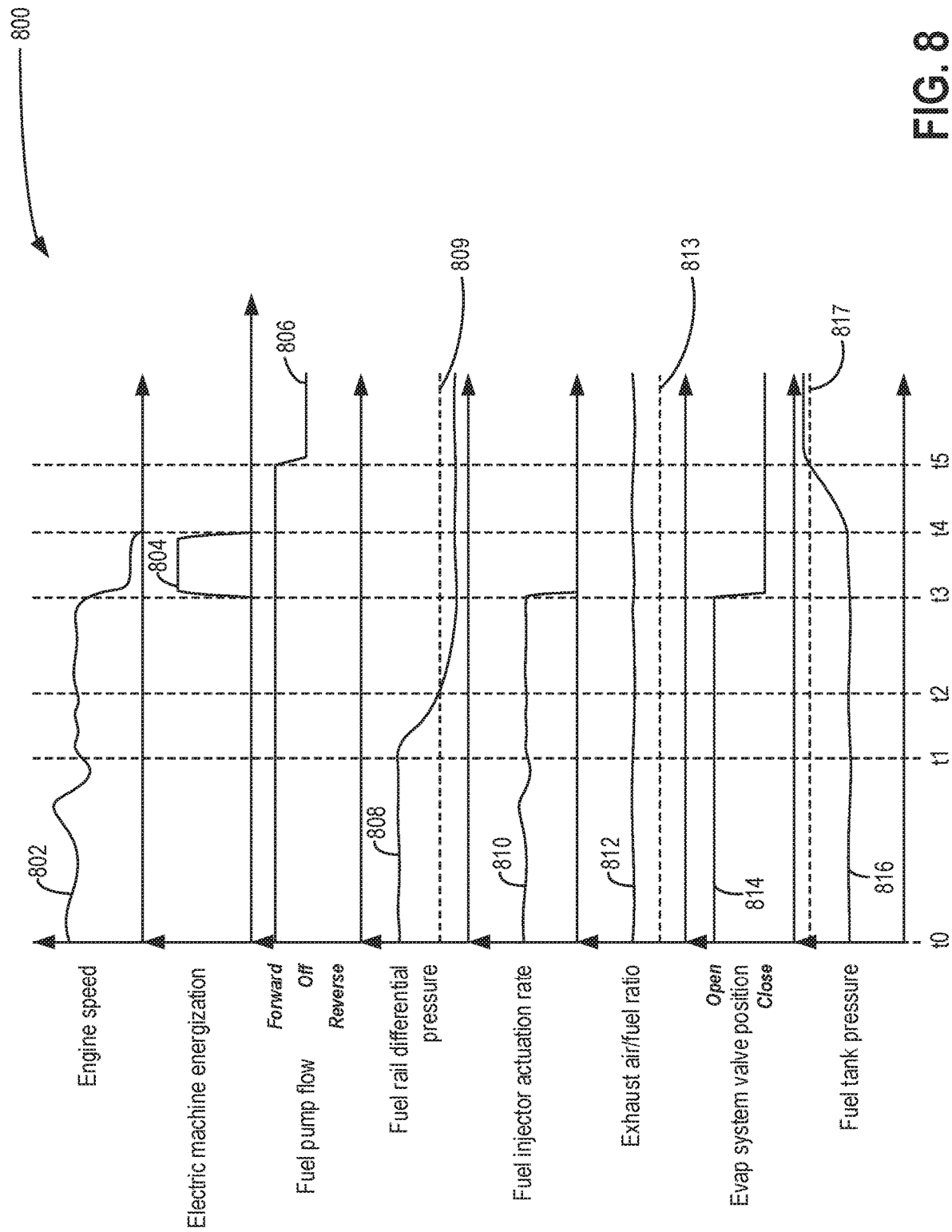

During conditions in which a pressure of fuel within a fuel rail of the engine is reduced below a threshold pressure while the engine is operating, an electronic controller of the engine adjusts operation of various vehicle components while the engine is not operating in order to diagnose degradation of components of the fuel system, as illustrated by the method of FIGS. 5-6. Fuel is purged from cylinders of the engine, and the fuel pump provides fuel to the fuel rail with fuel injectors of the engine being in a closed position. The controller monitors changes to an exhaust air/fuel ratio to determine if degradation of the fuel injectors has occurred, as illustrated by FIG. 7. If the controller determines that fuel injector degradation has not occurred, the controller monitors fuel tank pressure while an evaporative emission control system of the vehicle is sealed to atmosphere in order to determine whether degradation of a fuel pressure regulator or fuel line has occurred, as illustrated by FIG. 8. If the controller determines that degradation of the fuel injectors and fuel pressure regulator (or fuel line) has not occurred, the controller pulses fuel through the fuel pump in forward and reverse directions of the fuel pump order to clean a filter of the fuel pump, as illustrated by FIG. 9.

Figure 1:
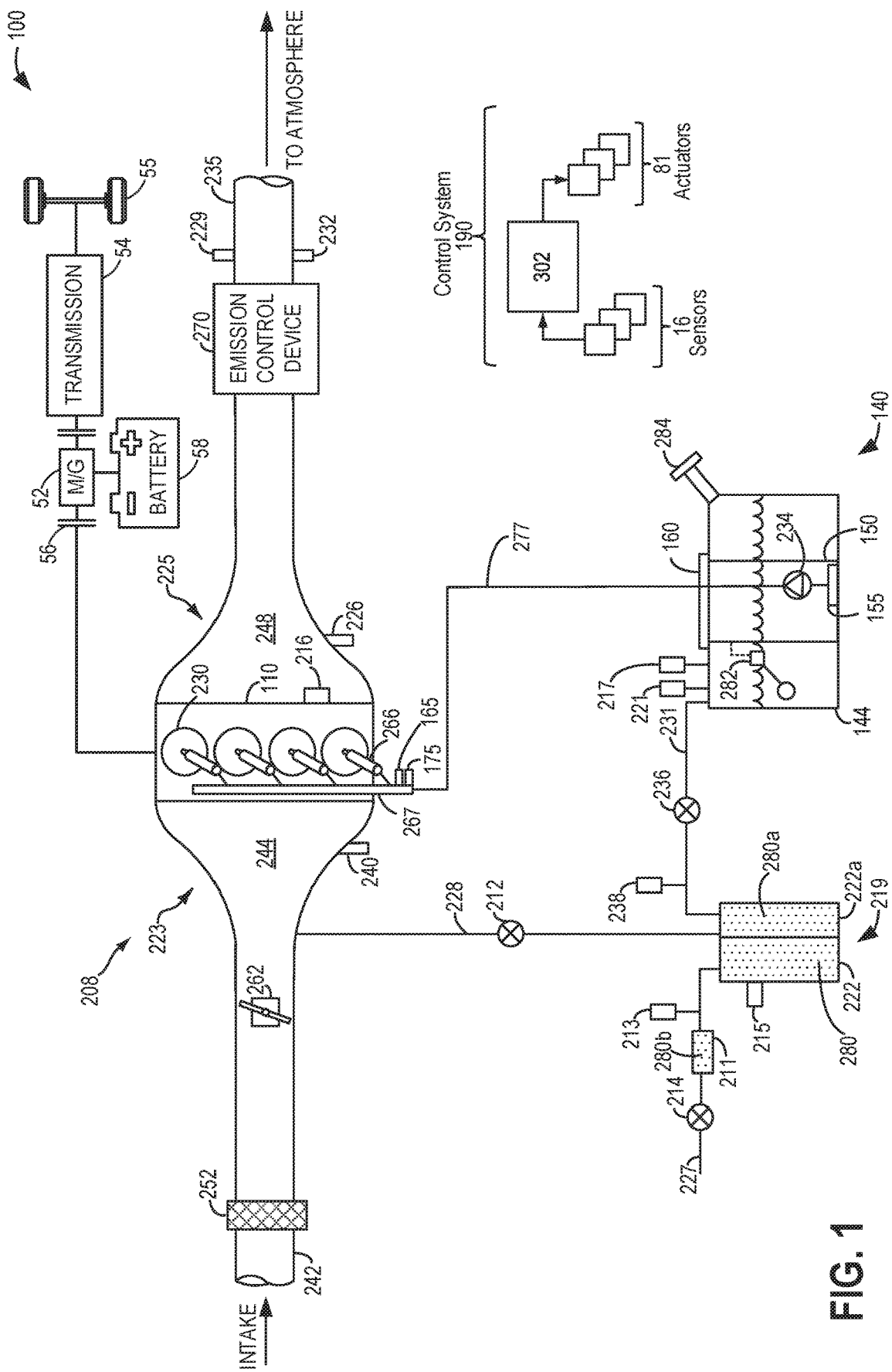
FIG. 1 schematically shows a vehicle including an engine, a fuel tank, and fuel lines configured to deliver liquid fuel from the fuel tank to the engine.

FIG. 1 schematically shows aspects of an example engine system 208, including engine 110, that may be coupled in vehicle 100. Engine 110 is shown having a plurality of cylinders 230. Engine 110 may include an engine intake system 223 and an engine exhaust system 225. Engine intake system 223 may include an air intake throttle 262 fluidly coupled to an intake manifold 244 via an intake passage 242. Intake air may be routed to intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include one or more emission control devices 270 mounted in a close-coupled position. The one or more emission control devices may include a three-way catalyst, a lean nitrogen oxide (NOx) trap, a selective catalytic reduction (SCR) catalyst, a particulate filter (e.g., a diesel particulate filter or a gasoline particulate filter), an oxidation catalyst, etc. As one example, one or more NOx sensors may be positioned upstream and/or downstream of emission control devices 270, such as for measuring an efficiency of NOx conversion by emission control devices 270. It will be appreciated that other components may be included in the engine, such as a variety of valves and sensors, as further elaborated in herein. In some embodiments, wherein engine system 208 is a boosted engine system, the engine system may further include a boosting device, such as a turbocharger (not shown).

Engine system 208 is coupled to fuel system 140 and an evaporative emissions system 219. Fuel system 140 includes fuel tank 144 having a fuel pump 234, the fuel pump 234 supplying a fuel from the fuel tank 144 to engine 110 to propel the vehicle 100. In the example shown by FIG. 1, the fuel pump 234 is coupled to (e.g., disposed within) a fuel delivery module 150 (FDM) of the fuel tank 144. FDM 150 may be a hollow column disposed within the fuel tank 144 in some examples, and may include several components not shown by FIG. 1. For example, FDM 150 may include one or more sensors, valves, additional fuel pumps, etc. configured to enable fuel to flow from the FDM 150 to fuel rail 167 via fuel line 277. In some examples, fuel level sensor 282 may be positioned at least partially within the FDM 150. Fuel system 140 additionally includes a plurality of fuel lines and other components configured to enable fuel to flow from the fuel tank 144 to the engine 110 (e.g., to flow from the fuel tank 144 to fuel rail 167 and a plurality of fuel injectors of the engine 110), and/or vice versa (in some conditions).

FDM 150 may include one or more control modules configured to be in electronic communication with control system 190 (e.g., controller 302). For example, the one or more control modules of the FDM 150 may determine operating conditions of the fuel tank 144 (e.g., fuel level, fuel tank pressure, fuel tank temperature, etc.) via signals (e.g., electrical signals) received from the fuel level sensor 282, temperature sensor 221, pressure sensor 217, etc., and may transmit information regarding the determined operating conditions to the controller 302. Further, controller 302 may transmit signals (e.g., electrical signals) to the one or more control modules of the FDM 150 in order to adjust operation of the components of the fuel system 140 (e.g., adjust a speed of fuel pump 234 and/or a flow direction of fuel from fuel pump 234). In the example shown by FIG. 1, FDM 150 includes a cover 160 configured to couple the FDM 150 to the fuel tank 144 and to seal the fuel tank 144 from atmosphere. In other examples, FDM 150 may not include the cover 160 and instead may be coupled to the fuel tank 144 in a different way (e.g., fastened via one or more fasteners, such as bolts).

Evaporative emissions system 219 includes a fuel vapor storage canister 222. During a fuel tank refueling event, fuel may be pumped into the vehicle from an external source through a refueling port 284. A fuel level sensor 282 located in fuel tank 144 may provide an indication of a fuel level ("Fuel Level Input") to a control module 302 (e.g., electronic controller) of control system 190. As depicted, fuel level sensor 282 may comprise a float connected to a variable resistor. Alternatively, other types of fuel level sensors may be used.

Fuel pump 234 is configured to deliver pressurized fuel to fuel injectors of engine 110, such as fuel injector 266. One or more fuel injectors may be provided for each cylinder. Pressurized fuel may be delivered from the fuel tank 144 to fuel injector 266 and the additional fuel injectors via fuel rail 267. It will be appreciated that fuel system 140 may be a return-less fuel system, a return fuel system, or various other types of fuel system. Vapors generated in fuel tank 144 may be routed to fuel vapor storage canister 222 via a conduit 231 for storage before being purged to the engine intake system 223.

Fuel vapor storage canister 222 is filled with an appropriate adsorbent 280 for temporarily trapping fuel vapors (including vaporized hydrocarbons) generated during fuel tank refueling operations, diurnal vapors, and/or running-loss vapors. In one example, adsorbent 280 is activated charcoal (e.g., carbon). While a single fuel vapor storage canister 222 is shown, it will be appreciated that fuel system 140 and evaporative emissions system 219 may include any number of fuel vapor storage canisters. When purging conditions are met, such as when the fuel vapor storage canister is saturated, vapors stored in fuel vapor storage canister 222 may be purged to engine intake system 223 via a purge line 228 by opening a canister purge valve (CPV) 212, which may be a normally closed valve. In one example, canister purge valve 212 may be a solenoid valve wherein opening or closing of the valve is performed via actuation of a canister purge solenoid (e.g., responsive to electrical signals transmitted to the solenoid by the controller 302).

Fuel vapor storage canister 222 may include a buffer 222a (or buffer region), with each of the fuel vapor storage canister and the buffer comprising adsorbent. For example, buffer 222a is shown packed with an adsorbent 280a. As shown, a volume of buffer 222a may be smaller than (e.g., a fraction of) a volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer may not be linear with the loading and unloading of the fuel vapor storage canister. As such, the effect of the fuel vapor storage canister buffer is to dampen any fuel vapor spikes flowing from the fuel tank to the fuel vapor storage canister, thereby reducing a likelihood of fuel vapor spikes going to the engine.

Fuel vapor storage canister 222 includes a vent 227 for routing gases out of the fuel vapor storage canister 222 to the atmosphere when storing fuel vapors from fuel tank 144. Vent 227 may also allow fresh air to be drawn into fuel vapor storage canister 222 when purging stored fuel vapors to engine intake 223 via purge line 228 and canister purge valve 212. While this example shows vent 227 communicating with fresh, unheated air, various modifications may also be used. Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, the canister vent valve may be in an open position that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent 280b that is different than the adsorbent material included in main fuel vapor storage canister 222. Alternatively, the adsorbent 280b in bleed fuel vapor storage canister 211 may be the same as adsorbent 280 included in main fuel vapor storage canister 222.

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by the engine control system 190 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister.

Vehicle 100 may have reduced engine operation times due to the vehicle being powered by engine system 208 during some conditions and by motor/generator 52 and/or battery 58 under other conditions (such as when vehicle 100 is a hybrid electric vehicle) or due to the engine shutting down when the vehicle is on and at rest (such as when vehicle 100 is a stop/start vehicle). While the reduced engine operation times may reduce overall carbon emissions from the vehicle, they may also lead to insufficient purging of fuel vapors from evaporative emission system 219. To at least partially address this, a fuel tank isolation valve (FTIV) 236 may be optionally included in conduit 231 such that fuel tank 144 is coupled to fuel vapor storage canister 222 via the valve. During regular engine operation (e.g., conditions in which degradation of one or more components of the fuel system 140 is not determined by the controller 302), FTIV 236 may be kept closed to decrease the amount of diurnal or "running loss" vapors directed to fuel vapor storage canister 222 from fuel tank 144. During refueling operations and selected purging conditions, FTIV 236 may be temporarily opened (e.g., opened for a duration) in order to direct fuel vapors from fuel tank 144 to fuel vapor storage canister 222. While the depicted example shows FTIV 236 positioned along conduit 231, in alternate embodiments, the isolation valve may be mounted on fuel tank 144.

One or more pressure sensors may be coupled to fuel system 140 and evaporative emissions system 219 for providing an estimate of a fuel system and an evaporative emissions system pressure, respectively. In the example illustrated in FIG. 1, a first pressure sensor 217 is coupled directly to fuel tank 144, and a second pressure sensor 238 is coupled to conduit 231 between FTIV 236 and fuel vapor storage canister 222. For example, first pressure sensor 217 may be a fuel tank pressure transducer (FTPT) coupled to fuel tank 144 for measuring a pressure of fuel vapor within fuel tank 144, and second pressure sensor 238 may measure a pressure of fuel vapor within evaporative emissions system 219. In alternative embodiments, first pressure sensor 217 may be coupled between fuel tank 144 and fuel vapor storage canister 222, specifically between the fuel tank and FTIV 236. In still other embodiments, a single pressure sensor may be included for measuring both the fuel system pressure and the evaporative system pressure, such as when FTIV 236 is open or omitted.

One or more temperature sensors 221 may also be coupled to fuel system 140 for providing an estimate of a fuel system temperature. In one example, the fuel system temperature is a temperature of fuel within the fuel tank, wherein temperature sensor 221 is a fuel tank temperature sensor coupled to fuel tank 144. While the depicted example shows temperature sensor 221 directly coupled to fuel tank 144, in alternate embodiments, the temperature sensor may be coupled between the fuel tank and fuel vapor storage canister 222.

Control system 190 is shown receiving information from a plurality of sensors 16 (various examples of which are described herein) and sending control signals to a plurality of actuators 81 (various examples of which are described herein). As one example, sensors 16 may include an exhaust gas sensor 226 (e.g., heated exhaust gas oxygen sensor, or HEGO) located upstream of emission control device 270, a temperature sensor 232 coupled to exhaust passage 235, a manifold absolute pressure (MAP) sensor 240 coupled to intake manifold 244, an engine coolant temperature sensor 216 coupled to a cooling sleeve of engine 110, FTPT 217, second pressure sensor 238, hydrocarbon sensor 213, temperature sensor 221, fuel level sensor 282, temperature sensor 215, fuel rail pressure sensor 165, fuel rail temperature sensor 175, and a pressure sensor 229 located downstream of emission control device 270. Other sensors, such as additional pressure, temperature, air/fuel ratio, and composition sensors, may be coupled to various locations in the vehicle 100. For example, an estimate of the MAP or manifold vacuum (ManVac) may be obtained by control module 302 from MAP sensor 240. Alternatively, MAP may be inferred from alternate engine operating conditions, such as mass air flow (MAF), as measured by a MAF sensor (not shown) coupled to intake manifold 244. As another example, actuators 81 may include fuel injector 266, FTIV 236, purge valve 212, vent valve 214, fuel pump 234, and throttle 262.

In one example, adjusting an amount of fuel flowing from fuel rail 267 to engine cylinders 230 may include adjusting an actuator coupled to the fuel rail 267 (e.g., adjusting an amount of opening, duration of opening, etc. of fuel injector 266) to adjust the amount of fuel injected into the cylinders 230.

In some examples, control system 190 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 190 may further be configured to transmit or receive information via the internet or other communication networks. Information received from the GPS may be cross-referenced to information available via the internet to determine local weather conditions, local vehicle regulations, etc. Control system 190 may use the internet to obtain updated software modules, which may be stored in non-transitory memory.

Control module 302 of control system 190 may be configured as a conventional microcomputer including a microprocessor unit, input/output ports, read-only memory, random access memory, keep alive memory, a CAN bus, etc. Control module 302 may be configured as a powertrain control module (PCM), for example. Control module 302 may receive input data from the various sensors, process the input data, and trigger the actuators in response to the processed input data based on instruction or code programmed therein corresponding to one or more routines. Example control routines are described herein with regard to FIGS. 5 and 6.

In some examples, control module 302 may be placed in a reduced power mode or sleep mode, wherein the control module maintains essential functions only and operates with a lower battery consumption than in a corresponding awake mode. For example, the control module may be placed in the sleep mode following a vehicle key-off event (e.g., a human driver removing a key from a vehicle, leaving the proximity of the vehicle with a key fob, and/or otherwise instructing the vehicle to be in an off/inoperative state, at which time combustion of fuel/air within the engine may be stopped, a crankshaft of the engine stops rotating, and electrical propulsion devices, if present, may be deactivated) in order to perform a diagnostic routine a duration after the vehicle key-off event, as will be further described with respect to FIGS. 5 and 6. The control module may have a wake input that allows the control module to be returned to the awake mode based on an input received from one or more sensors. For example, the opening of a vehicle door may trigger a return to an awake mode. In other examples, the control module may be awoken in order to execute one or more afterrun tasks, including diagnostic and non-diagnostic features. In such an example, requesting features of the control module may set a timer via an alarm wake system following the vehicle key-off event before the control module enters the sleep mode such that the control module may be awoken to perform the one or more afterrun tasks before the vehicle is turned on, as further described herein. For example, when the timer elapses, an electrical circuit may wake the control module to operate in an alarm wake mode. As one non-limiting example of a diagnostic feature that may be performed as an afterrun task, control module 302 may be configured to perform fuel system diagnostic routines to determine the presence or absence of degradation of fuel system components (e.g., fuel filter 155) while the vehicle is off.

In some examples, vehicle 100 may be a hybrid vehicle with multiple sources of torque available to one or more vehicle wheels 55. In other examples, vehicle 100 is a conventional vehicle with only an engine. In the example shown by FIG. 1, vehicle 100 includes engine 110 and electric machine 52. Electric machine 52 may be a motor or a motor/generator. The crankshaft of engine 10 and electric machine 52 are connected via a transmission 54 to vehicle wheels 55 when one or more clutches 56 are engaged. In the depicted example, a first clutch 56 is provided between the crankshaft and electric machine 52, and a second clutch 56 is provided between electric machine 52 and transmission 54. Controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from traction battery 58 to provide torque to vehicle wheels 55. Electric machine 52 may also be operated as a generator to provide electrical power to charge battery 58, for example during a braking operation.

Figure 2:
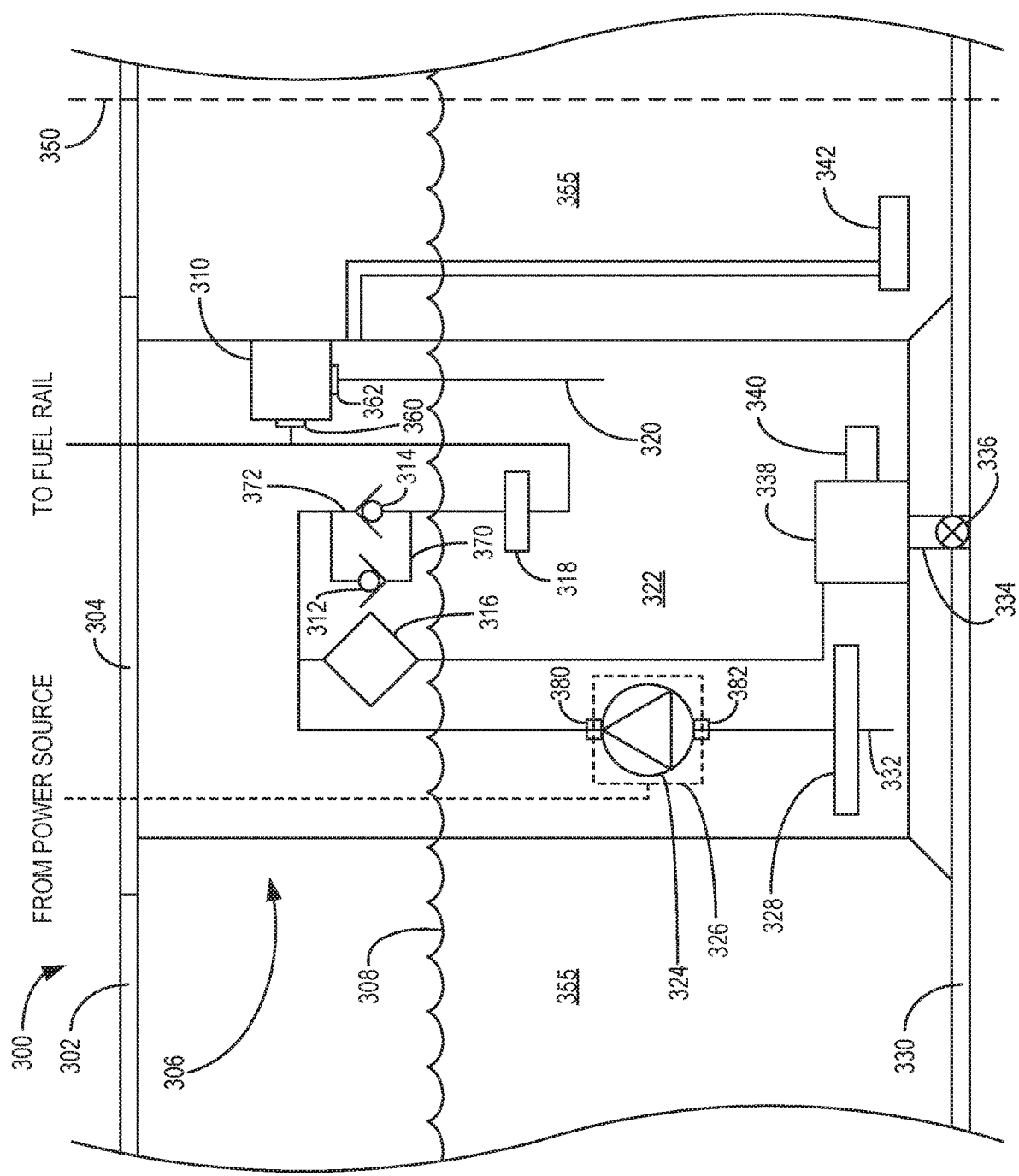
FIG. 2 schematically shows a fuel delivery module of a fuel tank of a vehicle, with the fuel delivery module including a fuel pump and a fuel filter.
Figure 3:
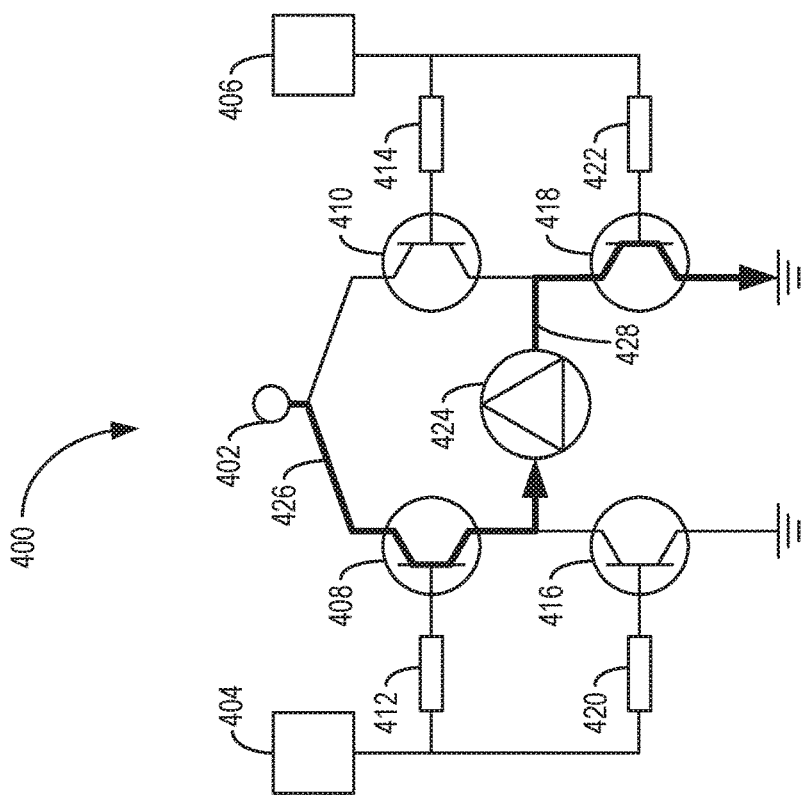

FIG. 2 schematically shows a partial interior view of a fuel tank 300. In one example, fuel tank 300 may be similar to the fuel tank 144 shown by FIG. 1 and described above. Further, fuel tank 300 may be included within a vehicle, such as the vehicle 100 shown by FIG. 1 and described above. Fuel tank 300 includes a fuel delivery module 306 (FDM). In some examples, FDM 306 may be similar to the FDM 150 described above with reference to FIG. 1, and several of the components included by the fuel tank 300 and/or FDM 306 may be similar to components described above with reference to FIG. 1. For example, cover 304, fuel level sensor 342, fuel pump 324, and fuel filter 328 may be similar to cover 160, fuel level sensor 282, fuel pump 234, and fuel filter 155, respectively. Fuel level sensor 342 may measure a level (e.g., amount) of fuel 308 disposed within the fuel tank 300.

FDM 306 extends from bottom wall 330 of the fuel tank 300 to top wall 302 of the fuel tank 300. In some examples, an axis 350 extending from the bottom wall 330 to the top wall 302 and positioned normal to both of the bottom wall 330 and top wall 302 may be parallel to a direction of gravity during conditions in which the fuel tank 300 is coupled to the vehicle (e.g., supported by a frame of the vehicle).

In the example shown by FIG. 2, the FDM 306 may receive fuel disposed within the fuel tank 300 via one or more passages fluidly coupling an interior 322 of the FDM 306 to an interior 355 of the fuel tank 300. For example, fuel may flow from the interior 355 of the fuel tank 300 into passage 334 of the FDM 306 via valve 336. In some examples, valve 336 may be a check valve configured to enable fuel to flow into the interior 322 of the FDM 306 from the interior 355 of the fuel tank 300 via the passage 334, and to reduce a likelihood of fuel flowing from the interior 322 of the FDM 306 to the interior 355 of the fuel tank 300 (e.g., to an exterior of the FDM 306, external to the interior 322). In the depicted example, fuel may be further directed from the interior 355 of the fuel tank to the interior 322 of the FDM via a circulation pump 338 including a nozzle 340. Fuel may flow through the passage 334 to an inlet of the circulation pump 338, and may flow out the nozzle 340 of the circulation pump 338 into the interior 322 of the FDM. Actuation of the circulation pump 338 may be controlled by a controller of the vehicle in some examples (e.g., controller 302). In one example, the controller may transmit electrical signals to the circulation pump 338 in order to adjust a speed and/or operating mode of the circulation pump 338. In another example, the controller may transmit electric signals to one or more control modules of the FDM 306 indicating a desired speed and/or operating mode of the circulation pump 338, and the one or more control modules may transmit electrical signals to the circulation pump 338 in order to adjust the circulation pump 338 to the desired speed and/or operating mode.

As described above, FDM 306 further includes fuel pump 324. Fuel pump 324 is configured to flow fuel from the fuel tank 300 (e.g., from the interior 322 of the FDM 306) to one or more fuel rails of the vehicle (e.g., fuel rail 267 described above with reference to FIG. 1). Fuel pump 324 may receive fuel from the interior 322 of the FDM 306 via fuel line 332 coupled to inlet 382 of the fuel pump 324, with the fuel flowing into the fuel pump 324 being filtered by fuel filter 328. In some examples, fuel pump 324 and fuel filter 328 may be integrated together such that the fuel filter 328 is directly coupled (e.g., mounted) to the fuel pump 324. Fuel filter 328 may be configured to filter particulate matter (e.g., dust, dirt, etc.) from the fuel delivered to fuel pump 324 in order to reduce a likelihood of degradation of the fuel pump 324.

As shown schematically by FIG. 2, the fuel pump 324 is coupled to a power source via electrical circuit 326. In some examples, the power source may be a power source of the vehicle, such as the battery 58 and/or motor/generator described above with reference to FIG. 1. Fuel pump 324 may be a direct current pump in one example, and electrical circuit 326 may be configured to selectably flow electrical current in a forward or reverse direction to the fuel pump 324 in order to control a fuel pumping direction of the fuel pump 324. For example, during conditions in which the electrical circuit 326 provides electrical current to the fuel pump 324 in the forward direction, fuel pump 324 may pump fuel through the fuel line 332 in a direction away from the fuel filter 328 and toward the fuel rail. During conditions in which the electrical circuit 326 provides electrical current to the fuel pump 324 in the reverse direction, fuel pump 324 may pump fuel through the fuel line 332 in a direction away from the fuel rail and toward the fuel filter 328. The direction of electrical current flowing to fuel pump 324 via the electrical circuit 326 may be controlled (e.g., adjusted) by the controller (e.g., controller 302), similar to the examples described further below.

During conditions in which fuel flows from the fuel pump 324 in the forward direction as described above, a first portion of the fuel may flow through fuel line 332 toward first check valve 314 and a second portion of the fuel may flow through fuel line 332 toward choke 316. In one example, choke 316 may be an adjustable valve configured to return fuel to circulation pump 338 for recirculation within the interior 322 of the FDM 306. For example, fuel may flow through the fuel filter 328, through the fuel pump 324, and may return to recirculation pump 338 via choke 316, such that fuel flowing to the recirculation pump 338 from choke 316 may have a reduced likelihood of carrying particulate matter (e.g., dirt, dust, etc.) to the recirculation pump 338. Further, during conditions in which it may be desirable to reduce a flow of fuel to the fuel rail while operating the fuel pump 326 (e.g., in order to adjust an amount of fuel delivered to the fuel rail and/or increase a filtration of the fuel disposed within the interior 322 of the FDM 306), the controller may increase an amount of opening of the choke 316 in order to increase an amount of the second portion of the fuel flowing from the fuel pump 324 relative to the first portion (e.g., an amount flowing to the choke 316 instead of the first check valve 314), as described above.

Fuel flowing from the fuel pump 324 to the first check valve 314 may be further filtered by a fine fuel filter 318 positioned downstream of the first check valve 314 relative to the flow of fuel through the fuel line 332 during conditions in which the fuel pump 324 flows fuel in the forward direction. In one example, fine fuel filter 318 may be configured to remove additional particulate matter from the fuel after being filtered by fuel filter 328. For example, fine fuel filter 318 may be configured to include a finer screen (e.g., screen with smaller openings) relative to screens included by the fuel filter 328. Because fuel filter 328 may be configured with a less fine screen than fine fuel filter 318, fuel filter 318 may be adapted for larger fuel flow rates than fine fuel filter 328 in some examples.

First check valve 314 is configured to enable fuel to flow in a direction from the fuel pump 324 to the fine fuel filter 318, and to reduce a likelihood of fuel flowing in an opposite direction from the fine fuel filter 318 to the fuel pump 324. However, FDM 306 additionally includes a second check valve 312, with the second check valve 312 being positioned in parallel with the first check valve 314 and configured to enable fuel to flow in the direction from the fine fuel filter 318 to the fuel pump 324, and to reduce a likelihood of fuel flowing through the second check valve 312 in the direction from the fuel pump 324 to the fine fuel filter 318. Specifically, second check valve 312 is coupled to fuel line segment 370 and first check valve is coupled to fuel line segment 372, with the fuel line segments 370 and 372 each being fluidly coupled to fuel pump 324 in parallel relative to each other. As shown, the first check valve 314 and the second check valve 312 are fluidly coupled in parallel to an outlet 380 of the fuel pump 324, downstream of the outlet 380 and upstream of a fuel pressure regulator 310.

In one example, the first check valve 314 may be configured to enable fuel to flow from the fuel pump 324 and through the first check valve 314 (e.g., configured to adjust to a partially or fully opened position) to the fine fuel filter 318 during conditions in which a pressure of the fuel within the fuel line segment 372 is above a first threshold pressure (e.g., a threshold pressure within a range of 14 kPa-21 kPa in one example, such as 15 kPa), and the second check valve 312 may be configured to enable fuel to flow from the fine fuel filter 318 and through the second check valve 312 (e.g., configured to adjust to a partially or fully opened position) to the fuel pump 324 during conditions in which a pressure of the fuel within the fuel line segment 370 is above a second threshold pressure (e.g., a threshold pressure within a range of 345 kPa-448 kPa in one example, such as 400 kPa), with the second threshold pressure being greater than the first threshold pressure. For example, during conditions in which the fuel pump 324 is energized to flow fuel in the forward direction (e.g., toward the fuel rail), fuel in each of the fuel line segment 372 and the fuel line segment 370 may be above the first threshold pressure and below the second threshold pressure. As a result, fuel may flow from the fuel pump 324 through the first check valve 314 and toward the fine fuel filter 318, and fuel may not flow from the fine fuel filter through the second check valve 312 and toward the fuel pump 324 (e.g., the second check valve 312 may not adjust to the partially or fully opened position). However, during conditions in which the fuel pump 324 is energized to flow fuel in the reverse direction, the pressure of fuel in the fuel line segment 372 may be reduced, and the pressure of fuel in the fuel line segment 370 may be increased above the second threshold pressure. As a result, fuel may flow from the fine fuel filter 318 through the second check valve 312 and to the fuel pump 324, and fuel may not flow to the fine fuel filter through the first check valve 314 and toward the fuel rail (e.g., the first check valve 314 may not adjust to the partially or fully opened position).

In yet other examples, each of the first check valve 314 and second check valve 312 may be configured to flow fuel in response to a pressure differential. For example, first check valve 314 may be configured to enable fuel to flow from the fuel pump 324 to the fine fuel filter 318 during conditions in which a pressure of fuel within the fuel line segment 372 is greater than a pressure of fuel within the fuel line segment 370, and fuel may not flow through the second check valve 312 while the fuel pressure within the fuel line segment 372 is greater than the fuel pressure within the fuel line segment 370. Further, the second check valve 312 may be configured to enable fuel to flow from the fine fuel filter 318 to the fuel pump 324 during conditions in which the fuel pressure within the fuel line segment 370 is greater than the fuel pressure within the fuel line segment 372 (e.g., during conditions in which the fuel pump 324 is energized in the forward direction), and fuel may not flow through the first check valve 314 while the fuel pressure within the fuel line segment 370 is greater than the fuel pressure within the fuel line segment 372 (e.g., during conditions in which the fuel pump 324 is energized in the reverse direction).

The FDM 306 further includes fuel pressure regulator 310 configured to adjust a fuel pressure of fuel flowing from the fuel pump 324 to the fuel rail (or vice versa). In some examples, the fuel pressure regulator 310 adjusts the fuel pressure in response to signals (e.g., electrical signals) transmitted to an actuator (e.g., valve) of the fuel pressure regulator 310 by the electronic controller (e.g., controller 302 shown by FIG. 1 and described above). Fuel pressure regulator 310 includes an inlet 360 fluidly coupled to the fuel pump 324 (e.g., via fuel line 332) and an outlet 362 fluidly coupled to the interior 322 of the FDM 306 via return line 320. Specifically, return line 320 is coupled to outlet 362 to enable the fuel pressure regulator 310 to return a portion of fuel pumped in the forward direction by fuel pump 324 to the interior 322 of the FDM 306. In one example, fuel pump 324 may be energized in order to flow fuel in the forward direction toward the fuel rail (e.g., through the fine fuel filter 318 and toward the fuel rail via fuel line 332), and a portion of the fuel flowing in the forward direction toward the fuel rail may be directed into the inlet 360 of the fuel pressure regulator 310. The portion of fuel directed into the inlet 360 may flow through the fuel pressure regulator 310 and return to the interior 322 of the FDM 306 (e.g., be stored within the interior 322 of the FDM 306) via the return line 320.

The controller may adjust operation of the fuel pressure regulator 310 in order to control the amount of fuel flowing into the inlet 360 of the fuel pressure regulator 310. For example, the controller may transmit electrical signals to the fuel pressure regulator 310 to adjust an amount of opening of a valve (e.g., poppet valve) of the fuel pressure regulator 310, with the amount of opening of the valve determining the portion of fuel flowing into the inlet 360. The valve may be adjusted to a fully opened position, a fully closed position, and a plurality of positions between the fully opened position and fully closed position, with an increased amount of opening of the valve resulting in an increased amount of fuel flowing into the inlet 360 and returning to the interior 322 of the FDM 306 through outlet 362 via return line 320.

By adjusting the amount of fuel flowing into the fuel pressure regulator 310, the controller may adjust the pressure of fuel flowing from the fuel pump 324 to the fuel rail. For example, increasing the amount of fuel flowing into the fuel pressure regulator 310 (e.g., by increasing the amount of opening the valve of the fuel pressure regulator 310 as described above) may reduce a pressure of fuel flowing to the fuel rail, and decreasing the amount of fuel flowing into the fuel pressure regulator 310 (e.g., by decreasing the amount of opening of the valve of the fuel pressure regulator 310) may increase the pressure of fuel flowing to the fuel rail. Increasing or decreasing the pressure of fuel flowing to the fuel rail may respectively increase or decrease the pressure of fuel disposed within the fuel rail (e.g., fuel rail pressure).

During some conditions as described below with reference to FIGS. 5-9, degradation of one or more fuel system components (e.g., the fuel injectors, fuel pressure regulator, fuel filter, etc.) may occur. The controller may first determine whether the fuel injectors and fuel pressure regulator are degraded, and in response to determining that the fuel injectors and fuel pressure regulator are not degraded, the controller performs a fuel filter cleaning routine. The fuel filter cleaning routine includes flowing fuel through the fuel filter and the fuel pump in the forward direction and the reverse direction for a plurality of pulses in order to reduce degradation of the fuel filter (e.g., remove debris from the fuel filter and/or unclog the fuel filter). In one example, adjusting the flow of fuel through the fuel pump and fuel filter from the forward direction to the reverse direction (and vice versa) may include reversing a direction of electrical current flowing through the fuel pump via the electrical circuit 326, similar to the example described below with reference to FIGS. 3-4.

FIGS. 3-4 each show an electrical circuit 400 (e.g., H-Bridge circuit, similar to electrical circuit 326 of FIG. 2) configured to provide electrical power (e.g., electrical current) to a fuel pump, such as the fuel pump 234 shown by FIG. 1 or the fuel pump 324 shown by FIG. 2 and described above. Specifically, FIG. 3 shows the electrical circuit 400 operating in a first mode, and FIG. 4 shows the electrical circuit operating in a second mode, described further below.

In some examples, the electrical circuit 400 is similar to the electrical circuit 326 shown by FIG. 2 and described above.

Electrical circuit 400 includes a plurality of switches. In some examples, such as the examples shown by FIGS. 3-4, each switch of the plurality of switches may be a transistor. For example, electrical circuit 400 includes a first transistor 408, second transistor 410, third transistor 416, and fourth transistor 418. Further, electrical circuit 400 includes a first voltage input 404, a second voltage input 406, a plurality of resistors 412, 414, 420, and 422, and a power source 402. In some examples, power source 402 may be similar to battery 58 shown by FIG. 1 and described above. The first transistor 408 and third transistor 416 may each be coupled (e.g., electrically coupled) to the first voltage input 404, and may be referred to herein as a first set of switches. The second transistor 410 and fourth transistor 418 may each coupled be (e.g., electrically coupled) to the second voltage input 406, and may be referred to herein as a second set of switches.

The first transistor 408, second transistor 410, third transistor 416, and fourth transistor 418 may be selectably activated or deactivated (e.g., energized or de-energized) in order to vary operation of the electrical circuit 400 (e.g., adjust the electrical circuit from the first mode to the second mode, or vice versa). First voltage input 404 may be a lower electrical voltage source (e.g., 0V) and second voltage input 406 may be a higher voltage source (e.g., 5V). In one example, the first transistor 408 and the fourth transistor 418 may be activated (e.g., activated by the controller), and the second transistor 410 and the third transistor 416 may be deactivated (e.g., deactivated by the controller). In this configuration, electrical current from the power source 402 may flow through the fuel pump 424 in a first, forward direction as indicated by paths 426 and 428 shown by FIG. 3, such that a positive voltage is provided to the fuel pump 424 (e.g., applied across the fuel pump 424). As another example, the first transistor 408 and the fourth transistor 418 may be deactivated (e.g., deactivated by the controller), and the second transistor 410 and the third transistor 416 may be activated (e.g., activated by the controller). In this configuration, electrical current from the power source 402 may flow through the fuel pump 424 in a second, reverse direction as indicated by paths 430 and 432 shown by FIG. 4, such that a negative voltage is provided to the fuel pump 424 (e.g. applied across the fuel pump 424).

Powering the fuel pump 424 in the forward direction (e.g., flowing electrical current through the fuel pump 424 in the forward direction indicated by paths 426 and 428) may be referred to herein as the first mode of the electrical circuit 400, and powering the fuel pump 424 in the reverse direction (e.g., flowing electrical current through the fuel pump 424 in the reverse direction indicated by paths 430 and 432) may be referred to herein as the second mode of the electrical circuit 400.

During conditions in which the electrical circuit 400 is operating in the first mode as shown by FIG. 3, the fuel pump 424 may flow fuel in the forward direction (e.g., toward a fuel rail of a vehicle including the fuel pump 424, similar to fuel rail 267 of vehicle 100 shown by FIG. 1 and described above). During conditions in which the electrical circuit is operating in the second mode as shown by FIG. 4, the fuel pump 424 may flow fuel in the reverse direction (e.g., away from the fuel rail of the vehicle and toward an interior of an fuel tank of the vehicle, such as fuel tank 144 shown by FIG. 1 and described above, and/or the interior 322 of the FDM 306 shown by FIG. 2 and described above). By adjusting the electrical circuit 400 from the first mode to the second mode or vice versa, the controller may control the direction of fuel flowing from the fuel pump 424. In some examples, similar to those described below with reference to the method illustrated by FIGS. 5-6, the electrical circuit 400 may be adjusted from the first mode to the second mode and vice versa repeatedly in order to perform a cleaning routine of a fuel filter of the fuel pump. For example, fuel may be pulsed through the fuel pump and fuel filter in the forward and reverse directions in response to a determination by the controller that the fuel filter is degraded (e.g., clogged) in order to clean the fuel filter.

FIGS. 5-6 show a flowchart illustrating a method 500 for diagnosing degradation of components of a fuel system of a vehicle, such as the fuel system 140 of the vehicle 100 shown by FIG. 1 and described above. The method 500 includes determining whether degradation of components of the fuel system has occurred and, in response to determining degradation of a fuel filter of a fuel pump of the vehicle has occurred (e.g., fuel filter 155 of fuel pump 234 shown by FIG. 1 and described above, or fuel filter 328 of fuel pump 324 shown by FIG. 2 and described above), performing a cleaning routine to reduce degradation of the fuel filter.

Instructions for carrying out method 500 and the rest of the methods included herein may be executed by a controller (e.g., controller 302 shown by FIG. 1 and described above) based on instructions stored on a memory of the controller (e.g., computer readable instructions stored on non-transitory computer memory) and in conjunction with signals received from sensors of the engine system, such as the sensors described above with reference to FIG. 1. The controller may employ engine actuators of the engine system to adjust engine operation, according to the methods described below. For example, the controller may adjust a fuel flow direction of the fuel pump via an electrical circuit of the fuel pump (e.g., electrical circuit 326 or electrical circuit 400) in response to one or more determined parameters of the vehicle such as fuel rail pressure (e.g., via electrical signals transmitted to the controller by fuel rail pressure sensor 165), fuel tank vapor pressure (e.g., via electrical signals transmitted to the controller by pressure sensor 217), etc.

At 502, the method includes estimating and/or measuring engine operating conditions. In one example, engine operating conditions may include engine speed, engine torque output, intake boost pressure, fuel rail pressure and/or temperature, intake air flow rate, fuel tank vapor pressure and/or temperature, fuel injector timing, spark timing, exhaust gas flow rate, exhaust gas fuel/air ratio, an amount of opening of one or more valves (e.g., fuel tank isolation valve 236), etc. In one example, the controller may determine the engine operating conditions based on signals (e.g., electrical signals) transmitted to the controller by the various sensors of the vehicle. For example, the controller may determine fuel rail pressure based on an output of one or more fuel rail pressure sensors (e.g., fuel rail pressure sensor 165 shown by FIG. 1).

The method continues from 502 to 504 where the method includes determining whether the fuel rail pressure is less than a threshold fuel rail pressure while the engine is operating (e.g., running and combusting fuel/air in cylinders of the engine). For example, the engine may operate for a duration at 504, and the controller may compare the fuel rail pressure (e.g., pressure of fuel within the fuel rail) to the threshold fuel rail pressure throughout the entire duration. At 504, the controller may determine whether the fuel rail pressure decreases below the threshold fuel rail pressure at least once during the duration. In one example, the threshold fuel rail pressure may be a pre-determined threshold (e.g., a threshold pressure within a range of 207 kPa-310 kPa in one example, such as 250 kPa) stored in non-transitory memory of the controller. In another example, the threshold fuel rail pressure may be based on one or more engine operating parameters, such as the engine operating conditions described above at 502. For example, the threshold fuel rail pressure may be a variable pressure value based on engine speed and/or engine temperature. As engine speed increases, the threshold fuel rail pressure may increase, and as engine speed decreases, the threshold fuel rail pressure may decrease. For example, during conditions in which the engine speed is a lower, first engine speed (e.g., 800 RPM), the threshold fuel rail pressure may be a lower, first pressure (e.g., 207 kPa), and during conditions in which the engine speed is a higher, second engine speed (e.g., 4000 RPM), the threshold fuel rail pressure may be a higher, second pressure (e.g., 310 kPa).

If the fuel rail pressure is not less than the threshold fuel rail pressure at 504, the method continues to 506 where the method includes maintaining engine operating conditions. For example, at 506, the engine speed, engine torque output, fuel rail pressure, fuel pump flow rate and/or direction, etc. may be maintained (e.g., not adjusted) by the controller. In response to the determination that the fuel rail pressure is not less than the threshold fuel rail pressure at 504, the controller may indicate at 506 that degradation of one or more components of the fuel system has not occurred. For example, the controller may indicate that degradation of the fuel filter (e.g., fuel filter 328 shown by FIG. 2 and described above) has not occurred.

However, if the fuel rail pressure is less than the threshold fuel rail pressure at 504, the method continues to 508 where the method includes determining whether an engine key-off is requested. In one example, the request for engine key-off may be performed by an operator of the vehicle (e.g., a driver of the vehicle) via one or more user interface devices (e.g., keyed ignition switch, ON/OFF button, touch screen or touch panel, etc.). For example, the operator of the vehicle may park the vehicle and turn an ignition switch of the vehicle to an OFF position, indicating to the controller to adjust the engine from the operating mode (e.g., the mode in which the engine is running and combustion fuel/air occurs within cylinders of the engine) to a diagnostic mode (e.g., a mode in which fuel/air is not combusted within cylinders of the engine).

The method continues from 508 to 510 where the method includes transitioning the engine from the operating mode to the diagnostic mode and purging fuel from an intake system of the engine (e.g., intake system 223 shown by FIG. 1 and described above). In one example, in response to the engine key-off request described above with reference to 508, the controller transitions the engine from the operating mode to the diagnostic mode by stopping the combustion of fuel/air within the engine cylinders. Fuel may then be purged from the intake system by driving the engine without combustion of fuel/air while the engine is in the diagnostic mode. For example, an electric machine (e.g., motor/generator 52 shown by FIG. 1 and described above) may drive (e.g., rotate) a crankshaft of the engine in order to move pistons disposed within the cylinders of the engine without combusting fuel/air within the cylinders. In some examples, driving the crankshaft of the engine via the electric machine without injecting fuel into the cylinders of the engine may be referred to herein as running the engine unfueled. At 510, the engine may run unfueled for a duration, as described below. While the engine is in the diagnostic mode, torque provided to the crankshaft in order to drive the crankshaft does not come from combustion of fuel/air within engine cylinders. In some examples, the engine may include cam-driven intake valves and/or exhaust valves, with the cams configured to drive the intake valves and/or exhaust valves coupled to camshafts of the engine. Driving the crankshaft via the electric machine may result in a rotation of the camshafts, with the rotation of the crankshafts causing an opening and/or closing the intake valves and/or exhaust valves. In other examples, the intake valves and/or exhaust valves may be opened and/or closed by a different mechanism (e.g., one or more electronically controlled actuators, such as solenoids).

At 510, purging the fuel from the intake system may include adjusting exhaust valves of the engine to an opened position (e.g., via rotation of the camshafts, or via one or more electronically controller actuators, as described above), adjusting fuel injectors of the engine to a fully closed position (e.g., such as fuel injector 266 shown by FIG. 1 and described above), and driving the crankshaft of the engine via the electric machine in order to push residual fuel and air out of the intake system and engine cylinders and into an exhaust system of the engine (e.g., exhaust system 225 shown by FIG. 1 and described above). For example, following the transition of the engine from the operating mode to the diagnostic mode, some residual fuel may be trapped within the cylinders of the engine. In order to remove the fuel from the cylinders, the electric machine drives the pistons of the engine via the crankshaft in order to flow the fuel and air from the cylinders into the exhaust system. In some examples in which the engine includes port fuel injection (e.g., mixing of fuel/air at a location upstream of the cylinders), fuel may be removed from the intake system by flowing the fuel/air mixture through the cylinders and to the exhaust system without combusting the fuel/air mixture (e.g., by driving the crankshaft via the electric machine).

In some examples, the engine may be driven by the electric machine in order to purge fuel from the cylinders and intake system for a pre-determined duration (e.g., a pre-determined number of complete rotations of the crankshaft), and the controller may monitor (e.g., measure) an air/fuel ratio in an exhaust system of the engine (e.g., an exhaust passage coupled to the engine) throughout the entire pre-determined duration. In other examples, the engine may be driven by the electric machine in order to purge fuel from the cylinders and intake system based on an output of one or more sensors of the engine and/or prior engine operating conditions. For example, the controller may monitor (e.g., continuously measure) an output of a manifold absolute pressure (MAP) sensor (e.g., MAP sensor 240) and/or exhaust gas sensor (e.g., exhaust gas sensor 226), and may drive the engine via the electric machine to purge the fuel from the cylinders and intake system until an output of the MAP sensor and/or exhaust gas sensor is below a threshold output. In one example, the engine may be driven via the electric machine until the air/fuel ratio measured by the exhaust gas sensor is below a threshold air/fuel ratio, with the threshold air/fuel ratio corresponding to a ratio of fuel/air within the exhaust manifold during conditions in which fuel/air is combusted within at least one engine cylinder (e.g., a ratio of 15:1 for a gasoline engine, in one example).

The method continues from 510 to 512 where the method includes closing fuel injectors of the engine and operating the fuel pump in a forward direction. For example, throughout a duration (which may be referred to herein as a flow duration) in which the fuel pump is operated in the forward direction at 512, each fuel injector of the engine is maintained in a fully closed position (e.g., a position in which a nozzle of each fuel injector is fully closed and in which fuel does not normally flow from the fuel injectors into the engine cylinders) throughout the entire duration. In one example, the duration in which the fuel pump is operated in the forward direction is a pre-determined duration (e.g., 10 seconds). The forward direction of the fuel pump is a direction in which fuel is pumped by the fuel pump to the fuel rail of the engine, similar to the examples described above with reference to FIGS. 1-4. By maintaining the fuel injectors in the fully closed position while operating the fuel pump in the forward direction, fuel cannot normally flow out of the fuel injectors (e.g., into the engine cylinders). However, during conditions in which one or more of the fuel injectors is degraded, a portion of fuel pumped by the fuel pump may flow out of the one or more degraded fuel injectors. In order to determine whether one or more of the fuel injectors is degraded, the controller may continuously measure an exhaust air/fuel ratio of the engine, as described below.

The method continues from 512 to 514 where the method includes determining whether the exhaust air/fuel ratio is less than a threshold ratio. In one example, the controller continuously measures (e.g., measures without pausing or interruption) the exhaust air/fuel ratio for the entire duration in which the fuel pump is operated in the forward direction while the engine is in the diagnostic mode. The exhaust air/fuel ratio may be measured via signals (e.g., electrical signals) transmitted to the controller by an exhaust gas sensor, such as exhaust gas sensor 226 (e.g., heated exhaust gas oxygen sensor) shown by FIG. 1 and described above. In one example, the exhaust gas sensor may sense (e.g., measure) an amount of oxygen present in gases disposed within the exhaust system, and the controller may determine (e.g., calculate) the air/fuel ratio based on the amount of oxygen (e.g., based on electrical signals transmitted to the controller by the exhaust gas sensor). Further, in some examples, the controller may receive signals from an exhaust gas flow rate sensor (e.g., exhaust gas mass flow sensor) disposed within the exhaust system, and may determine (e.g., calculate) the air/fuel ratio based on signals transmitted to the controller by both of the exhaust gas sensor (e.g., exhaust gas sensor 226) and the exhaust gas flow rate sensor. For example, the controller may include a look-up table stored in non-transitory memory, with exhaust gas flow mass and amount of oxygen being inputs, and with air/fuel ratio being an output.

The controller may additionally continuously compare the measured exhaust air/fuel ratio to the threshold ratio in order to determine whether the measured exhaust air/fuel ratio is less than the threshold ratio. Higher exhaust air/fuel ratios (e.g., 100:1) indicate a higher concentration of air relative to fuel, and lower exhaust air/fuel ratios (e.g., 10:1) indicate a lower concentration of air relative to fuel. In one example, the threshold ratio may be higher (e.g., 20:1) than a ratio corresponding to a stoichiometric air/fuel ratio of the engine (e.g., 14.7:1).

If the measured exhaust air/fuel ratio is less than the threshold ratio at 514, the method continues to 516 where the method includes indicating that fuel injector degradation has occurred. By comparing the measured exhaust air/fuel ratio to the threshold ratio, the controller diagnoses degradation of the fuel injectors, and during conditions in which the measured exhaust air/fuel ratio is less than the threshold ratio, the controller determines that degradation has occurred and indicates the degradation to the operator of the vehicle. For example, at 516, the controller may indicate to the operator of the vehicle that one or more of the fuel injectors is degraded via an audio and/or visual cue (e.g., by illuminating a light on an instrument panel within a cabin of the vehicle, and/or emitting a sound from the instrument panel). Due to the exhaust air/fuel ratio being less than the threshold value, the controller determines that degradation of one or more of the fuel injectors has occurred. For example, although the controller transmits electrical signals to the fuel injectors to adjust each of the fuel injectors to be fully closed at 512 (e.g., to fully close each nozzle of each fuel injector such that fuel does not flow from the nozzles of the fuel injectors), one or more of the fuel injectors may experience degradation enabling fuel to flow from the fuel injectors during conditions in which the fuel injectors are fully closed. The fuel flowing from the one or more degraded fuel injectors may result in an increased amount of fuel in the exhaust system of the engine, lowering the air/fuel ratio below the threshold ratio. Additionally, operating the fuel pump in the forward direction while the fuel injectors are closed increases a flow of fuel from degraded fuel injectors, enabling the lowered air/fuel ratio to be more easily detected (e.g., measured). The controller may additionally decrease the flow of fuel through the fuel pump at 516 (e.g., stop pumping fuel through the fuel pump) after indicating that degradation of the fuel injectors has occurred.

If the measured exhaust air/fuel ratio is not less than the threshold ratio at 514, the method continues from 514 to 518 where the method includes sealing an evaporative emissions system of the vehicle (e.g., evaporative emissions system 219 shown by FIG. 1 and described above). For example, the controller may transmit electrical signals to a valve of the evaporative emissions system (e.g., fuel tank isolation valve 236) in order to fluidly isolate a fuel tank of the vehicle (e.g., fuel tank 144 or fuel tank 300) from a fuel vapor canister of the vehicle (e.g., fuel vapor storage canister 222). Further, inlets of the fuel tank (e.g., refueling port 284,) are sealed from atmospheric air such that an interior of the fuel tank (e.g., interior 355) is not in fluid communication with an exterior of the fuel tank at 518.

The method continues from 518 to 520 where the method includes determining whether a fuel tank pressure is greater than a threshold pressure. For example, the controller may continuously monitor (e.g., continuously measure, without pausing or interruption) a fuel vapor pressure within the interior of the fuel tank via one or more fuel tank vapor pressure sensors (e.g., pressure sensor 217) for a duration, and may compare the measured fuel vapor pressure to the threshold pressure throughout the entire duration. In some examples, the duration in which the controller monitors the fuel vapor pressure may overlap the duration in which the controller monitors the exhaust fuel/air ratio (e.g., as described above at 512 and 514). The threshold pressure may be a pre-determined threshold pressure (e.g., 207 kPa) in some examples. In other examples, the threshold pressure may be based on one or more vehicle parameters, such as fuel tank temperature (e.g., as determined via an output of a fuel tank temperature sensor, such as temperature sensor 221). For example, the threshold pressure may increase as fuel tank temperature increases, and the threshold pressure may decrease as fuel tank temperature decreases.

If the fuel tank pressure is greater than the threshold pressure at 520, the method continues to 522 where the method includes indicating fuel tank pressurized component degradation. In one example, pressurized components of the fuel tank include fuel lines (e.g., fuel line 332 shown by FIG. 2 and described above) and/or a fuel pressure regulator (e.g., fuel pressure regulator 310) disposed within the interior of the fuel tank. By comparing the measured fuel tank pressure to the threshold pressure, the controller diagnoses degradation of any of the fuel tank pressurize components, and during conditions in which the measured fuel tank pressure (e.g., fuel tank vapor pressure) is greater than the threshold pressure, the controller determines that degradation has occurred and indicates the degradation to the operator of the vehicle. In one example, the fuel pressure regulator and/or fuel lines may experience degradation that causes fuel to spray from the fuel pressure regulator and/or fuel lines. The fuel spray may increase an amount of fuel vapor within the fuel tank, and because the fuel tank is sealed at 518, the increased amount of fuel vapor accumulates within the fuel tank and results in an increased fuel tank pressure. The controller measures the fuel tank pressure, and due to the fuel tank pressure being greater than the threshold pressure at 520, the controller determines that degradation of the fuel tank pressurized components has occurred. Additionally, operating the fuel pump in the forward direction while the fuel tank is sealed increases a flow of fuel through the degraded pressurized components, enabling the increase in fuel tank pressure to be more easily detected (e.g., measured). At 522, the controller may indicate to the operator of the vehicle that one or more of the fuel tank pressurized components is degraded via an audio and/or visual cue (e.g., by illuminating a light on an instrument panel within a cabin of the vehicle, and/or emitting a sound from the instrument panel). The controller may additionally decrease the flow of fuel through the fuel pump at 522 (e.g., stop pumping fuel through the fuel pump) after indicating that degradation of the fuel tank pressurized components has occurred.

If the fuel tank pressure is not greater than the threshold pressure at 520, the method continues from 520 to 526 (shown by FIG. 6) where the method includes pulsing fuel through the fuel pump and fuel filter for a duration (which may be referred to herein as a cycling duration). It should be noted that because the exhaust air/fuel ratio is not less than the threshold ratio at 514 and the fuel tank pressure is not greater than the threshold pressure at 520, the controller determines that degradation of the fuel injectors and the fuel tank pressurized components has not occurred. As a result, the controller determines that the fuel rail pressure being less than the threshold pressure at 504 is due to degradation of the fuel filter of the fuel pump. Specifically, before performing the fuel filter cleaning routine described herein with reference to 526 (e.g., pulsing fuel through the fuel pump and fuel filter for the duration), the controller first determines that the fuel rail pressure being below the threshold pressure is not a result of degradation of other components of the fuel system such as the fuel injectors, fuel pressure regulator, or fuel lines. Otherwise, if the controller determines that degradation of the fuel injectors or fuel tank pressurized components has occurred (as described above with reference to 514 and 520), the controller does not perform the fuel filter cleaning routine at 526.

Steps 504, 508, 510, 512, 514, 518, and 520 are performed to determine whether degradation of any of a plurality of engine fuel system components consisting of one or more fuel injectors and the fuel tank pressurized components (e.g., the fuel regulator and fuel line disposed within the fuel tank) has occurred, and responsive to determining that degradation of none of the plurality of engine fuel system components (e.g., the one or more fuel injectors and the fuel tank pressurized components) has occurred, the method proceeds to 526. The method at 526 includes adjusting operation of the vehicle fuel pump to perform the fuel filter cleaning routine.

By first determining whether degradation of the fuel injectors or fuel tank pressurized components has occurred, and by only performing the fuel filter cleaning routine at 526 if the controller determines that degradation of the fuel injectors and fuel tank pressurized components has not occurred, a likelihood of degradation of the fuel system resulting from the fuel filter cleaning routine may be reduced. For example, performing the fuel filter cleaning routine during conditions in which the fuel filter is not degraded may result in reduced fuel rail pressure, increased energy consumption (e.g., electrical energy provided to the fuel pump to operate the fuel pump while pulsing fuel through the fuel filter), increased fuel tank pressure (e.g., due to an increased flow of fuel within the fuel tank while the fuel is pulsed through the fuel filter), etc. Further, in some examples, the fuel filter cleaning routine may only be performed while additional conditions are present, such as while the fuel level within the fuel tank is above a threshold fuel level (e.g., a level corresponding to 20% of a fuel capacity of the fuel tank) and/or while the vehicle including the fuel tank is approximately level relative to a ground surface on which the vehicle sits. Performing the fuel filter cleaning routine at 526 only after determining that degradation of the fuel injectors and fuel tank pressurized components has not occurred increases a likelihood that the fuel filter cleaning routine will restore the fuel rail pressure to a pressure above the threshold fuel rail pressure. Specifically, because the controller determines that the fuel rail pressure being below the threshold fuel rail pressure at 504 is not a result of degradation of the fuel injectors or fuel tank pressurized components, the controller is able to more accurately determine that the decreased fuel rail pressure is instead a result of degradation of the fuel filter (e.g., a clog of the fuel filter), enabling the controller to perform the fuel filter cleaning routine without risk of further degrading the fuel system.

At 526, pulsing fuel through the fuel pump and the fuel filter for the duration (e.g., cycling duration) includes flowing fuel through the fuel pump in the forward direction at 528 and flowing fuel in a reverse direction while reducing vacuum in an outlet line of the fuel pump at 529. Flowing (e.g., pumping) fuel through the fuel pump in the forward direction may result from energizing the fuel pump in a configuration similar to that shown by FIG. 3 (e.g., flowing electrical current through the fuel pump in the forward direction indicated by arrows 426 and 428), and flowing (e.g., pumping) fuel through the fuel pump in the reverse direction may result from energizing the fuel pump in a configuration similar to that shown by FIG. 4 (e.g., flowing electrical current through the fuel pump in the reverse direction indicated by arrows 430 and 432). Flowing fuel in the forward direction of the fuel pump includes flowing fuel from an inlet of the fuel pump (e.g., inlet 382 shown by FIG. 2 and described above) to an outlet of the fuel pump (e.g., outlet 380 shown by FIG. 2 and described above). Flowing fuel in the reverse direction of the fuel pump includes flowing fuel from the outlet of the fuel pump to the inlet of the fuel pump. The outlet fluidly couples the fuel pump to the engine fuel rail via a fuel line (e.g., fuel line 332), and the inlet fluidly couples the fuel pump to the fuel filter and fuel stored within the fuel tank.

In one example, the duration at 526 may be a pre-determined duration stored in non-transitory memory of the controller. For example, the duration may correspond to a pre-determined amount of time (e.g., 5 seconds, 10 seconds, etc.), and the fuel may be pulsed through the fuel pump and fuel filter throughout the entire duration at a pre-determined frequency (e.g., 1 pulse per second). In another example, the duration may correspond to an amount of time to perform a pre-determined number of pulses of fuel through the fuel pump and fuel filter (e.g., 5 pulses, 10 pulses, etc.). As described herein, each pulse of fuel through the fuel pump and fuel filter includes first flowing the fuel through the fuel pump and fuel filter in the forward direction of the fuel pump, then flowing fuel through the fuel pump and fuel filter in the reverse direction of the fuel pump.

In other examples, the duration may not be a pre-determined duration and may instead be based on one or more vehicle parameters such as the determined fuel rail pressure compared to the threshold fuel rail pressure at 504. For example, during conditions in which the fuel rail pressure is less than the threshold fuel rail pressure by a first, smaller amount (e.g., 14 kPa below the threshold fuel rail pressure), the duration at 526 may be a first, smaller duration (e.g., 5 seconds or 5 pulses), and during conditions in which the fuel rail pressure is less than the threshold fuel rail pressure by a second, greater amount (e.g., 30 kPa below the threshold fuel rail pressure), the duration at 526 may be a second, greater duration (e.g., 10 seconds or 10 pulses). By performing the fuel filter cleaning routine for the duration, with the duration being based on the difference between the measured fuel rail pressure and the threshold fuel rail pressure as described above, degradation of the fuel filter may be reduced more effectively. For example, the fuel rail pressure being less than the threshold fuel rail pressure by the second, greater amount may indicate a greater amount of degradation of the fuel filter relative to conditions in which the fuel rail pressure is less than the threshold fuel rail pressure by the first, smaller amount. As a result, performing the fuel filter cleaning routine for the second, greater duration may provide an increased reduction in fuel filter degradation relative to performing the fuel filter cleaning routine for the first, smaller duration. Additionally, during conditions in which the fuel rail pressure is less than the threshold fuel rail pressure by the first, smaller amount, it may be more desirable to perform the fuel filter cleaning routine for the first, smaller duration in order to reduce an energy consumption of the fuel pump (e.g., relative to an energy consumption of the fuel pump while performing the fuel filter cleaning routine for the second, greater duration).

As described above, at 526 the fuel filter cleaning routine may include performing a plurality of pulses (which may be referred to herein as fuel pulse cycles) of fuel through the fuel pump and fuel filter, with each pulse including first flowing (e.g., pulsing) the fuel through the fuel pump and the fuel filter in the forward direction (e.g., toward the fuel rail), then flowing (e.g., pulsing) fuel through the fuel pump and the fuel filter in the reverse direction (e.g., opposite direction, toward the interior of the fuel tank). In one example, a single pulse of fuel through the fuel pump and the fuel filter may include flowing fuel through the fuel pump and the fuel filter in the forward direction for a first duration (e.g., one second), and then flowing fuel through the fuel pump and the fuel filter in the reverse direction for a second duration (e.g., one second). The first duration and second duration may be a same amount of time in some examples. In other examples, the first duration and second duration may be a different amount of time. For example, during a single pulse at 526, the first duration may be a smaller amount of time (e.g., 0.5 seconds) than the second duration (e.g., 1 second) such that the amount of time that the fuel flows through the fuel pump and the fuel filter in the reverse direction during the single pulse is greater than the amount of time that the fuel flows through the fuel pump and the fuel filter in the forward direction during the single pulse. By flowing the fuel through the fuel pump and fuel filter in this way, the fuel filter cleaning routine may have a greater likelihood of reducing degradation of the fuel filter (e.g., unclogging the fuel filter). In yet other examples, one or more pulses of the plurality of pulses may include different durations of fuel flow through the fuel pump and the fuel filter in the forward direction and the reverse direction relative to one or more other pulses of the plurality of pulses. As one example, the first pulse of the plurality of pulses may include flowing fuel through the fuel pump and the fuel filter in the forward direction for a first duration (e.g., one second), then flowing fuel through the fuel pump and the fuel filter in the reverse direction for a second duration (e.g., one second). A second pulse of the plurality of pulses may include flowing fuel through the fuel pump and the fuel filter in the forward direction for a third duration (e.g., two seconds), then flowing fuel through the fuel pump and the fuel filter in the reverse direction for a fourth duration (e.g., two seconds). Other examples are possible.

Throughout each pulse of fuel through the fuel pump and fuel filter performed at 526, as the fuel flows in the reverse direction, the amount of vacuum in the outlet line of the fuel pump (e.g., fuel line 322 including fuel line segments 370 and 372 shown by FIG. 2 and described above) may be reduced. In one example, the amount of vacuum in the outlet line (e.g., the fuel line fluidly coupling the fuel pump to the fuel rail) may be reduced by opening one or more of the fuel injectors of the engine as the fuel pump is operated in the reverse direction. Specifically, as described above, each pulse includes first flowing the fuel in the forward direction, then flowing the fuel in the reverse direction. While the fuel is flowing in the reverse direction, the one or more fuel injectors may be opened (e.g., nozzles of the one or more fuel injectors may be adjusted to an opened position) in order to reduce the amount of vacuum in the fuel line (e.g., increase the pressure within the fuel line), and while the fuel is flowing in the forward direction, the one or more fuel injectors may be closed to reduce a likelihood of flowing fuel from the fuel pump into the engine cylinders via the fuel injectors.

The method continues from 526 to 530 where the method includes determining whether an engine key-on is requested. In one example, the request for engine key-on may be performed by the operator of the vehicle via one or more user interface devices (e.g., keyed ignition switch, ON/OFF button, touch screen or touch panel, etc.). In some examples, the one or more user interface devices may be the same user interface devices utilized at 508 for the engine key-off request. For example, the operator of the vehicle may turn the ignition switch of the vehicle to an ON position, indicating to the controller to adjust the engine from the diagnostic mode (e.g., the mode in which the engine is not combusting fuel/air) to the operating mode (e.g., the mode in which the engine is running and fuel/air is combusted within cylinders of the engine). It should be noted that at 530, the engine key-on request refers to the most recent engine key-on request immediately following the fuel filter cleaning routine described above at 526, with no other engine key-on requests occurring therebetween.

If engine key-on is not requested at 530, the method continues from 530 to 531 where the method includes not turning on the engine. For example, at 531, the controller may not initiate spark in the engine cylinders and/or inject fuel into the engine cylinders in order to initiate combustion of air/fuel within the engine cylinders. The engine is at rest at 531 and is maintained at rest.

However, if engine key-on is requested at 530, the method continues from 530 to 532 where the method includes priming the fuel rail by operating the fuel pump in the forward direction. For example, at 532, priming the fuel rail may include operating the fuel pump in the forward direction in order to flow fuel through the fuel pump toward the fuel rail. The controller may transmit electrical signals to the fuel pump in order to flow electrical current through the fuel pump in the forward direction, resulting in a flow of fuel through the fuel pump toward the fuel rail (e.g., as described above with reference to FIG. 2). In one example, the fuel pump may be operated in the forward direction for a pre-determined duration (e.g., 5 seconds) in order to prime the fuel rail. In other examples, the fuel pump may be operated in the forward direction for a duration based on a pressure of fuel within the fuel rail at 532 (e.g., as measured by one or more sensors, such as pressure sensor 165). For example, the fuel pump may be operated in the forward direction until the pressure of fuel within the fuel rail exceeds a threshold pressure, with the threshold pressure being a pre-determined pressure (e.g., 207 kPa) for atomization of fuel within the engine cylinders via the fuel injectors.

The method continues from 532 to 534 where the method includes turning on the engine and determining the fuel rail pressure while the engine is operating. For example, at 534, the fuel rail pressure (e.g., the pressure of fuel within the fuel rail) may be determined while the engine is idling immediately after turning the engine on. Turning on the engine includes adjusting the engine to the operating mode in which fuel/air is combusted within the engine cylinders and the crankshaft is driven by the combustion of the fuel/air.

The method continues from 534 to 536 where the method includes determining whether the fuel rail pressure is less than a threshold fuel rail pressure. The threshold fuel rail pressure at 536 may be the same threshold fuel rail pressure as the threshold fuel rail pressure described above with reference to 504, in some examples. The controller compares the determined fuel rail pressure at 534 to the threshold fuel rail pressure at 536 in order to determine whether the fuel filter cleaning routine described above with reference to 526 has reduced degradation of the fuel filter (e.g., unclogged the fuel filter). For example, if the determined (e.g., measured) pressure at 534 is greater than the threshold fuel rail pressure at 536, the controller may determine that the fuel filter cleaning routine has reduced the degradation of the fuel system (e.g., degradation of the fuel filter). However, if the determined pressure is less than the threshold fuel rail pressure at 536, the controller may determine that the fuel filter cleaning routine has not entirely reduced the degradation of the fuel system and that one or more components of the fuel system may still have degradation.

If the determined fuel rail pressure is greater than the threshold fuel rail pressure at 536, the method continues from 536 to 542 where the method includes indicating completion of the fuel filter cleaning routine. For example, as described above, the determined fuel rail pressure being greater than the threshold fuel rail pressure may indicate that performing the fuel filter cleaning routine at 526 reduced degradation of the fuel filter. Specifically, reducing the degradation of the fuel filter may enable a greater amount of fuel to flow through the fuel filter to the fuel rail via the fuel pump, resulting in an increased fuel rail pressure relative to conditions in which the fuel filter is degraded (e.g., clogged). As a result, the controller may indicate to the operator of the vehicle that the fuel filter cleaning routine has completed. In one example, the controller may indicate to the operator of the vehicle that the fuel filter cleaning routine has completed via an audio and/or visual cue (e.g., by illuminating a light on the instrument panel within the cabin of the vehicle, and/or emitting a sound from the instrument panel).

However, if the determined fuel rail pressure is less than the threshold fuel rail pressure at 536, the method instead continues from 536 to 538 where the method includes indicating fuel system degradation. Because the controller has determined that degradation of the fuel injectors has not occurred at 514 and that degradation of the fuel tank pressurized components has not occurred at 520, and because the fuel filter cleaning routine at 526 has not resulted in the fuel rail pressure being greater than the threshold fuel rail pressure at 536 (e.g., due to an unclogging of the fuel filter), the controller at 538 may indicate that one or more other components of the fuel system are degraded. For example, one or more fuel lines positioned externally relative to the fuel tank (e.g., outside of the interior of the fuel tank) may be degraded, resulting in the fuel rail pressure being less than the threshold fuel rail pressure at 536. At 538, the controller may indicate to the operator of the vehicle that the one or more other components of the fuel system are degraded (e.g., components other than the fuel injectors, fuel tank pressurized components, and fuel filter). In one example, the controller may indicate to the operator the vehicle that the one or more other components of the fuel system are degraded via an audio and/or visual cue, similar to the examples described above.

If the vehicle is an autonomous vehicle (AV), the method continues from 538 to 540 where the method includes returning the vehicle to a service station. For example, an autonomous vehicle may be a vehicle driven without an operator (e.g., human driver), where autonomous driving sensors may generate signals that help navigate the vehicle while the vehicle is operating in an autonomous (e.g., driverless) mode. An autonomous vehicle control system included within the vehicle's control system (e.g., control system 190) may provide indications and/or requested output of the engine system to the control system. The control system, in accordance with the AV control system requests, then actuates various vehicle actuators to propel the vehicle. In the case of an AV, the vehicle may include various devices for detecting vehicle surroundings, such as radar, laser light, GPS, odometry, and computer vision sensors. Advanced control systems, as part of the AV control system, may interpret sensory information to identify appropriate navigation paths, as well as obstacles and relevant signage (e.g., speed limits, traffic signals, and the like). The AV control system may further include executable instructions that are capable of analyzing sensory data to distinguish between different vehicles on the road, which can aid in planning a path to the desired destination. For example, the AV control system may include executable instructions to detect a type of roadway (e.g., one-way street, freeway, divided highway, and the like), or an available parking space (e.g., an empty space with enough clearance for the vehicle that is not prohibited based on time of day or loading zone, and the like). Furthermore, the AV control system may include executable instructions to, in combination with sensory feedback, park a vehicle in a designated or detected available parking space.

At 540, because the determined fuel rail pressure is less than the threshold fuel rail pressure at 536, the controller may determine that returning the vehicle to a service station is desirable for maintenance and/or repair of the fuel system components indicated as degraded at 538. In some examples, the controller may make a determination of whether to return the vehicle to the service station based on a difference between the determined fuel rail pressure and the threshold fuel rail pressure, with the determined fuel rail pressure being less than the threshold fuel rail pressure as described above with reference to 538. For example, during conditions in which the difference between the determined fuel rail pressure and threshold fuel rail pressure is greater than a threshold difference, the controller may determine to return the vehicle to the service station for maintenance and/or repair of the fuel system.

FIGS. 7-9 each show graphs illustrating vehicle parameters (e.g., engine operating conditions) throughout various steps of the method 500 described above with reference to FIGS. 5-6. Specifically, FIG. 7 shows a graph 700 illustrating conditions in which a controller of the vehicle (e.g., controller 302 shown by FIG. 1 and described above) diagnoses degradation of one or more fuel injectors of the vehicle (e.g., similar to steps 514 and 516 of method 500), FIG. 8 shows a graph 800 illustrating conditions in which the controller diagnoses degradation of fuel tank pressurized components of the vehicle (e.g., similar to steps 520 and 522 of method 500), and FIG. 9 shows a graph 900 illustrating conditions in which the controller diagnoses degradation of a fuel filter of the vehicle and performs a fuel filter cleaning routine (e.g., similar to steps 526, 528, and 529 of method 500). The engine and vehicle may be similar to the engine 110 and vehicle 100 described above with reference to FIG. 1.

Turning first to graph 700 shown by FIG. 7, several plots are shown. Specifically, plot 702 illustrates engine speed, plot 704 illustrates energization of an electric machine of the vehicle (e.g., motor/generator 52 shown by FIG. 1 and described above), plot 706 illustrates fuel pump flow (e.g., flow direction and flow rate), plot 708 illustrates fuel rail differential pressure, plot 710 illustrates fuel injector actuation rate (e.g., opening rate or frequency), plot 712 illustrates exhaust air/fuel ratio, plot 714 illustrates evaporative emissions system valve position, and plot 716 illustrates fuel tank pressure (e.g., fuel tank vapor pressure). The fuel rail differential pressure illustrated by plot 708 refers to a pressure of the fuel rail relative to a pressure of gases within the engine cylinders during injection of fuel into the engine cylinders. For example, in order to atomize the fuel provided to the engine cylinders via the fuel injectors, the difference in pressure (e.g., pressure differential) between the fuel disposed within the fuel rail and the gases disposed within the engine cylinders may be maintained at approximately a same amount for different engine speeds. In one example, at lower engine speeds (e.g., idling engine speeds), the pressure of fuel within the fuel rail may be adjusted to a lower pressure (e.g., 207 kPa) by the controller (e.g., by adjusting an amount of opening of a fuel pressure regulator, such as fuel pressure regulator 310 shown by FIG. 2 and described above). At higher engine speeds (e.g., accelerating engine speeds), the pressure of fuel within the fuel rail may be adjusted to a higher pressure by the controller (e.g., 310 kPA), with the higher pressure being greater than the lower pressure, and with the pressure of the fuel within the fuel rail being adjustable to a plurality of different pressures between the higher pressure and lower pressure. However, at each of the lower engine speeds and the higher engine speeds, the pressure of the fuel within the fuel rail may be adjusted by the controller as described above in order to maintain approximately the same pressure differential (e.g., for atomization of the fuel via the fuel injectors).

Between time t0 and t1, the engine is operating as indicated by plot 702 (e.g., fuel/air is combusted in the engine cylinders). The fuel injector actuation rate indicated by plot 710 increases and decreases with increasing and decreasing engine speed, respectively. Fuel tank pressure indicated by plot 716 remains approximately constant and below a threshold fuel tank pressure 717 (e.g., similar to the threshold pressure described above with reference to 520 of method 500), and the evaporative emissions system valve (e.g., FTIV 236) remains in the opened position as indicated by plot 714. Further, the exhaust air/fuel ratio indicated by plot 712 remains approximately constant. In one example, the exhaust air/fuel ratio may be the stoichiometric ratio for operation of the engine (e.g., approximately 15:1 for gasoline engines). The fuel pump is energized and fuel pumped by the fuel pump flows in the forward direction as indicated by plot 706 (e.g., toward the fuel rail, as described above with reference to FIGS. 2-6).

At time t1, degradation of the fuel system occurs (e.g., one or more components of the fuel system experience degradation). As a result, between times t1 and t2, the fuel rail pressure is decreased, resulting in a decreased fuel rail differential pressure as indicated by plot 708.

At time t2, the fuel rail pressure is decreased below a threshold fuel rail pressure (e.g., the threshold fuel rail pressure described above with reference to 504 shown by FIG. 5), and the fuel rail differential pressure is correspondingly decreased below threshold fuel rail differential pressure 709. Due to the fuel rail pressure being below the threshold fuel rail pressure at time t2, the controller determines to adjust the engine to the diagnostic mode (described above with reference to FIG. 5) at the next engine key-off request.

Between time t2 and t3, the engine operates for a duration, as indicated by plot 702. However, due to the reduced fuel rail pressure described above, the engine may experience performance degradation (e.g., misfires, stalling, etc.) due to the degradation of the fuel system.

At time t3, an operator of the vehicle (e.g., human driver) performs an engine key-off request (e.g., as described above with reference to FIG. 5). As a result, between times t3 and t4, the fuel injector actuation rate indicated by plot 710 is decreased until the fuel injectors no longer inject fuel into the engine cylinders, and combustion of fuel/air does not occur within the engine cylinders. However, the engine is driven unfueled by the electric machine as indicated by plot 704 with the fuel injectors being in the fully closed position, similar to the example described above with reference to 510 shown by FIG. 5. Further, the fuel pump is operated in the forward direction as indicated by plot 706, and the valve of the evaporative emissions system (e.g., FTIV 236) is adjusted to a fully closed position by the controller. The controller continuously measures the exhaust air/fuel ratio indicated by plot 712 (e.g., via one or more exhaust gas sensors, such as exhaust gas sensor 226 shown by FIG. 1 and described above).

At time t4, the electric machine is de-energized and the engine is not driven by the electric machine or combustion of fuel/air. However, between times t4 and t5, fuel flow through the fuel pump (e.g., to the fuel rail) is maintained in the forward direction, similar to the example described above with reference to 510 shown by FIG. 5. Between times t4 and t5, the exhaust air/fuel ratio continues to decrease.

At time t5, the exhaust air/fuel ratio decreases below a threshold exhaust air/fuel ratio 713 (e.g., similar to the threshold exhaust air/fuel ratio described above with reference to 514 shown by FIG. 5). As a result, the controller determines that degradation of one or more of the fuel injectors has occurred (e.g., due to one or more fuel injectors flowing fuel into the exhaust system while the fuel injectors are closed, decreasing the air/fuel ratio). The controller may indicate the degradation of the one or more fuel injectors to the operator of the vehicle via an audio and/or visual cue, as described above with reference to 516 of method 500. In the example shown, the controller additionally adjusts the fuel pump to an OFF mode in order to reduce a flow of fuel to the degraded fuel injectors, as indicated by plot 706. In other examples, the controller may perform additional diagnostic steps similar to those described below with reference to FIG. 8 and above with reference to 518 of method 500. However, as described above with reference to 526, the fuel filter cleaning routine (e.g., pulsing fuel through the fuel filter and fuel pump, as described at 526) may only be performed if the controller determines that degradation of the fuel injectors and fuel tank pressurized components has not occurred. Because the controller determined that degradation of one or more of the fuel injectors occurred during the operating conditions shown by graph 700, the controller does not perform the fuel filter cleaning routine.

Turning next to graph 800 shown by FIG. 8, several plots are shown similar to those shown by FIG. 7, with the plots included by graph 800 corresponding to a different set of engine operating conditions relative to those described above with reference to graph 700. Plot 802 illustrates engine speed, plot 804 illustrates energization of an electric machine of the vehicle (e.g., motor/generator 52 shown by FIG. 1 and described above), plot 806 illustrates fuel pump flow (e.g., flow direction and flow rate), plot 808 illustrates fuel rail differential pressure, plot 810 illustrates fuel injector actuation rate (e.g., opening rate or frequency), plot 812 illustrates exhaust air/fuel ratio, plot 814 illustrates evaporative emissions system valve position, and plot 816 illustrates fuel tank pressure (e.g., fuel tank vapor pressure). The fuel rail differential pressure illustrated by plot 808 refers to a pressure of the fuel rail relative to a pressure of gases within the engine cylinders during injection of fuel into the engine cylinders, similar to plot 708.

The engine and other components described herein with reference to graph 800 of FIG. 8 may be the same engine and components described above with reference to graph 700 of FIG. 7. However, graph 800 is provided to illustrate conditions in which different components of the fuel system experience degradation relative to the degraded components described above with reference to graph 700 (e.g., the one or more degraded fuel injectors), and to illustrate the different steps performed by the controller in order to diagnose the fuel system degradation. For example, during the conditions illustrated by graph 800, degradation of one or more fuel injectors does not occur. As a result, the controller may perform a different and/or additional set of steps to diagnose the degradation of the fuel system relative to those described above with reference to graph 700. Specifically, the controller may determine whether degradation of fuel tank pressurized components has occurred, as described below (and as described above with reference to 518 and 520 of method 500).

Between time t0 and t1, the engine is operating as indicated by plot 802 (e.g., fuel/air is combusted in the engine cylinders). The fuel injector actuation rate indicated by plot 810 increases and decreases with increasing and decreasing engine speed, respectively. Fuel tank pressure indicated by plot 816 remains approximately constant and below a threshold fuel tank pressure 817 (e.g., similar to the threshold pressure described above with reference to 520 of method 500, and threshold fuel tank pressure 717 shown by graph 700), and the evaporative emissions system valve (e.g., FTIV 236) remains in the opened position as indicated by plot 814. Further, the exhaust air/fuel ratio indicated by plot 812 remains approximately constant. In one example, the exhaust air/fuel ratio may be the stoichiometric ratio for operation of the engine (e.g., approximately 15:1 for gasoline engines). The fuel pump is energized and fuel pumped by the fuel pump flows in the forward direction as indicated by plot 806 (e.g., toward the fuel rail, as described above with reference to FIGS. 2-6).

At time t1, degradation of the fuel system occurs (e.g., one or more components of the fuel system experience degradation). As a result, between times t1 and t2, the fuel rail pressure is decreased, resulting in a decreased fuel rail differential pressure as indicated by plot 808.

At time t2, the fuel rail pressure is decreased below a threshold fuel rail pressure (e.g., the threshold fuel rail pressure described above with reference to 504 shown by FIG. 5), and the fuel rail differential pressure is correspondingly decreased below threshold fuel rail differential pressure 809 (e.g., similar to threshold fuel rail differential pressure 709 of graph 700). Due to the fuel rail pressure being below the threshold fuel rail pressure at time t2, the controller determines to adjust the engine to the diagnostic mode (described above with reference to FIG. 5) at the next engine key-off request.

Between time t2 and t3, the engine operates for a duration, as indicated by plot 802. However, due to the reduced fuel rail pressure described above, the engine may experience performance degradation (e.g., misfires, stalling, etc.) due to the degradation of the fuel system.

At time t3, an operator of the vehicle (e.g., human driver) performs an engine key-off request (e.g., as described above with reference to FIG. 5). As a result, between times t3 and t4, the fuel injector actuation rate indicated by plot 810 is decreased until the fuel injectors no longer inject fuel into the engine cylinders, and combustion of fuel/air does not occur within the engine cylinders. However, the engine is driven unfueled by the electric machine as indicated by plot 804 with the fuel injectors being in the fully closed position, similar to the example described above with reference to 510 shown by FIG. 5. Further, the fuel pump is operated in the forward direction as indicated by plot 806, and the valve of the evaporative emissions system (e.g., FTIV 236) is adjusted to a fully closed position by the controller. The controller continuously measures the exhaust air/fuel ratio indicated by plot 812 (e.g., via one or more exhaust gas sensors, such as exhaust gas sensor 226 shown by FIG. 1 and described above) and the fuel tank pressure indicated by plot 816.

At time t4, the electric machine is de-energized and the engine is not driven by the electric machine or combustion of fuel/air. However, between times t4 and t5, fuel flow through the fuel pump (e.g., to the fuel rail) is maintained in the forward direction, similar to the example described above with reference to 510 shown by FIG. 5. Between times t4 and t5, the exhaust air/fuel ratio remains approximately constant (e.g., does not decrease significantly toward the threshold exhaust air/fuel ratio 713).

At times after t4, the exhaust air/fuel ratio does not decrease below the threshold exhaust air/fuel ratio 813. As a result, the controller determines that degradation of one or more of the fuel injectors has not occurred (e.g., due to a lack of fuel flowing from the fuel injectors into the exhaust system, indicated by the approximately constant air/fuel ratio). However, at time t5, the fuel tank pressure indicated by plot 816 increases above the threshold fuel tank pressure

817. As a result, the controller determines that degradation of fuel tank pressurized components has occurred. As described above with reference to 522 of method 500, fuel tank pressurized components may include fuel lines (e.g., fuel line 332 shown by FIG. 2 and described above) and/or a fuel pressure regulator (e.g., fuel pressure regulator 310) disposed within the interior of the fuel tank. The increase of the fuel tank pressure above the threshold fuel tank pressure may indicate that one or more of the fuel tank pressurized components is degraded. For example, during conditions in which one or more of the fuel tank pressurized components is degraded, the pressurized fuel tank components within an interior of the fuel tank may result in an increased amount of fuel vapor and increased fuel vapor pressure.

The controller may indicate the degradation of the fuel tank pressurized components to the operator of the vehicle via an audio and/or visual cue, as described above with reference to 522 of method 500. In the example shown, the controller additionally adjusts the fuel pump to an OFF mode in order to reduce a flow of fuel to the degraded fuel tank pressurized components, as indicated by plot 806. As described above with reference to 526, the fuel filter cleaning routine (e.g., pulsing fuel through the fuel filter and fuel pump, as described at 526) may only be performed if the controller determines that degradation of the fuel injectors and fuel tank pressurized components has not occurred. Because the controller determined that degradation of the fuel tank pressurized components occurred during the operating conditions shown by graph 800, the controller does not perform the fuel filter cleaning routine.

Turning next to graph 900 shown by FIG. 9, several plots are shown similar to those shown by FIG. 7 and FIG. 8, with the plots included by graph 900 corresponding to a different set of engine operating conditions relative to those described above with reference to graph 700 and graph 800. Plot 902 illustrates engine speed, plot 904 illustrates energization of an electric machine of the vehicle (e.g., motor/generator 52 shown by FIG. 1 and described above), plot 906 illustrates fuel pump flow (e.g., flow direction and flow rate), plot 908 illustrates fuel rail differential pressure, plot 910 illustrates fuel injector actuation rate (e.g., opening rate or frequency), plot 912 illustrates exhaust air/fuel ratio, plot 914 illustrates evaporative emissions system valve position, and plot 916 illustrates fuel tank pressure (e.g., fuel tank vapor pressure). The fuel rail differential pressure illustrated by plot 908 refers to a pressure of the fuel rail relative to a pressure of gases within the engine cylinders during injection of fuel into the engine cylinders, similar to plot 708 and plot 808.

The engine and other components described herein with reference to graph 900 of FIG. 9 may be the same engine and components described above with reference to graph 700 of FIG. 7 and graph 800 of FIG. 8. However, graph 900 is provided to illustrate conditions in which different components of the fuel system experience degradation relative to the degraded components described above with reference to graph 700 (e.g., the one or more degraded fuel injectors) and with reference to graph 800 (e.g., the degraded fuel tank pressurized components), and to illustrate the different steps performed by the controller in order to diagnose the fuel system degradation. For example, during the conditions illustrated by graph 900, degradation of one or more fuel injectors does not occur, and additionally, degradation of the fuel tank pressurized components does not occur. As a result, the controller may perform an additional set of steps to diagnose the degradation of the fuel system relative to those described above with reference to graph 700 and graph 800. Specifically, the controller may determine whether degradation of a fuel filter of the fuel pump has occurred and may perform a fuel filter cleaning routine, as described below (and as described above with reference to 526 of method 500).

Between time t0 and t1, the engine is operating as indicated by plot 902 (e.g., fuel/air is combusted in the engine cylinders). The fuel injector actuation rate indicated by plot 910 increases and decreases with increasing and decreasing engine speed, respectively. Fuel tank pressure indicated by plot 916 remains approximately constant and below a threshold fuel tank pressure 917 (e.g., similar to the threshold pressure described above with reference to 520 of method 500, threshold fuel tank pressure 717 shown by graph 700, and threshold fuel tank pressure 817 shown by graph 800), and the evaporative emissions system valve (e.g., FTIV 236) remains in the opened position as indicated by plot 914. Further, the exhaust air/fuel ratio indicated by plot 912 remains approximately constant. In one example, the exhaust air/fuel ratio may be the stoichiometric ratio for operation of the engine (e.g., approximately 15:1 for gasoline engines). The fuel pump is energized as indicated by plot 904, and the fuel pumped by the fuel pump flows in the forward direction as indicated by plot 906 (e.g., toward the fuel rail, as described above with reference to FIGS. 2-6).

At time t1, degradation of the fuel system occurs. As a result, between times t1 and t2, the fuel rail pressure is decreased, resulting in a decreased fuel rail differential pressure as indicated by plot 908.

At time t2, the fuel rail pressure is decreased below a threshold fuel rail pressure (e.g., the threshold fuel rail pressure described above with reference to 504 shown by FIG. 5), and the fuel rail differential pressure is correspondingly decreased below threshold fuel rail differential pressure 909 (e.g., similar to threshold fuel rail differential pressure 709 of graph 700 and threshold fuel rail differential pressure 809 shown by graph 800). In one example, the threshold fuel rail differential pressures 709, 809, and 909 may be a same threshold value. Due to the fuel rail pressure being below the threshold fuel rail pressure at time t2, the controller determines to adjust the engine to the diagnostic mode (described above with reference to FIG. 5) at the next engine key-off request.

Between time t2 and t3, the engine operates for a duration, as indicated by plot 902. However, due to the reduced fuel rail pressure described above, the engine may experience performance degradation (e.g., misfires, stalling, etc.) due to the degradation of the fuel system.

At time t3, an operator of the vehicle (e.g., human driver) performs an engine key-off request (e.g., as described above with reference to FIG. 5). As a result, between times t3 and t4, the fuel injector actuation rate indicated by plot 910 is decreased until the fuel injectors no longer inject fuel into the engine cylinders, and combustion of fuel/air does not occur within the engine cylinders. However, the engine is driven unfueled by the electric machine as indicated by plot 904 with the fuel injectors being in the fully closed position, similar to the example described above with reference to 510 shown by FIG. 5. Further, the fuel pump is operated in the forward direction as indicated by plot 906, and the valve of the evaporative emissions system (e.g., FTIV 236) is adjusted to a fully closed position by the controller. The controller continuously measures the exhaust air/fuel ratio indicated by plot 912 (e.g., via one or more exhaust gas sensors, such as exhaust gas sensor 226 shown by FIG. 1 and described above) and the fuel tank pressure indicated by plot 916.

At time t4, the electric machine is de-energized and the engine is not driven by the electric machine or combustion of fuel/air. However, between times t4 and t5, fuel flow through the fuel pump (e.g., to the fuel rail) is maintained in the forward direction, similar to the example described above with reference to 510 shown by FIG. 5. Between times t4 and t5, the exhaust air/fuel ratio remains approximately constant (e.g., does not decrease significantly toward the threshold exhaust air/fuel ratio 813). Additionally, between times t4 and t5, the fuel tank pressure remains approximately constant (e.g., does not increase significantly toward the threshold fuel tank pressure 917).

At times after t4, the exhaust air/fuel ratio does not decrease below the threshold exhaust air/fuel ratio 813. As a result, the controller determines that degradation of one or more of the fuel injectors has not occurred (e.g., due to a lack of fuel flowing from the fuel injectors into the exhaust system, indicated by the approximately constant air/fuel ratio). Additionally, at times after t4, the fuel tank pressure does not increase above the threshold fuel tank pressure 917. As a result, the controller determines that degradation of the fuel tank pressurized components has not occurred (e.g., due to the lack of increased fuel vapor and fuel vapor pressure within the fuel tank).

Responsive to the determination that degradation of the fuel injectors and fuel tank pressurized components has not occurred, the controller initiates a fuel filter cleaning routine similar to the routine described above at 526 of method 500. Specifically, between times t5 and t6, the controller adjusts operation of the fuel pump in order to pulse fuel through the fuel pump and fuel filter (e.g., in order to unclog the fuel filter). As illustrated by plot 906, a plurality of pulses of fuel through the fuel pump and fuel filter is performed, with each pulse including flowing fuel through the fuel pump and fuel filter in the forward direction, then flowing fuel through the fuel pump and fuel filter in the reverse direction. In the example shown by plot 906, the controller adjusts operation of the fuel pump to perform five pulses of fuel through the fuel pump and the fuel filter. In other examples, the controller may adjust operation of the fuel pump to perform a different number of pulses, as described above with reference to 526 of method 500.

Following completion of the fuel filter cleaning routine at time t6, the fuel pump is not energized for a duration until the next engine key-on event. Specifically, the duration between times t6 and t7 illustrates the engine at rest (e.g., not combusting fuel/air and not being driven by the electric machine), with the fuel pump in an OFF mode. The engine may remain in this condition until the next key-on event, illustrated at time t7.

At time t7, the operator of the vehicle (e.g., human driver) initiates the engine key-on request via one or more user interface devices (e.g., as described above with reference to 530 of method 500). As a result, between times t7 and t8, the fuel pump is energized in order to flow fuel through the fuel pump in the forward direction, as indicated by plot 906. In some examples, flowing fuel through the fuel pump in the forward direction in response to the key-on request may be referred to as priming the fuel rail, as illustrated by the increased fuel rail differential pressure between times t7 and t8 (shown by plot 908).

At time t8, the fuel injector actuation rate increases as shown by plot 910, and fuel/air is combusted within the cylinders of the engine to increase the speed of the engine as shown by plot 902. The controller measures the fuel rail pressure between times t8 and t9, and because the fuel rail pressure is above the threshold fuel rail pressure (and the fuel rail differential pressure indicated by plot 908 is above the threshold fuel rail differential pressure 909), the controller determines that the fuel filter cleaning routine has reduced the degradation of the fuel system (e.g., unclogged the fuel filter). At time t9, the valve of the evaporative emissions system is moved to the open position to unseal the fuel tank and enable fuel vapors to flow from a canister of the vehicle (e.g., canister 222 shown by FIG. 1 and described above) to the engine. After reducing the degradation of the fuel system via the routines described above, the engine may operate with increased engine performance (e.g., increased fuel economy, torque output, etc.).

In this way, by first determining whether degradation of the fuel injectors or the fuel tank pressurized components (e.g., fuel pressure regulator) has occurred, the controller may more effectively diagnose whether degradation of the fuel filter has occurred. During conditions in which the controller determines that the fuel injectors and fuel tank pressurized components are not degraded, the controller performs the fuel filter cleaning routine in order to reduce degradation of the fuel filter. By performing the fuel filter cleaning routine only after determining that degradation of the fuel injectors and fuel tank pressurized components has not occurred, a likelihood of increasing fuel rail pressure by reducing the degradation of the fuel filter is increased. For example, performing the fuel filter cleaning routine during conditions in which the fuel filter is not degraded may result in an increased energy consumption of the fuel pump (e.g., increased usage of electrical energy) and increase a load and/or wear of electrical components of the vehicle. However, by performing the fuel filter cleaning routine only after determining that degradation of the fuel injectors and fuel tank pressurized components has not occurred, the amount of energy consumed by the fuel pump may be reduced, and fuel system performance may be increased.

The technical effect of pulsing fuel through the fuel pump and fuel filter after determining that degradation of the fuel injectors and fuel tank pressurized components has not occurred is to reduce fuel filter degradation and increase fuel rail pressure.

In one embodiment, a method comprises: responsive to an engine fuel rail pressure decreasing below a threshold pressure, determining degradation of any of a plurality of engine fuel system components including a fuel injector, a fuel regulator, and a fuel line coupled to a fuel pump; and responsive to determining that degradation of any of the plurality of engine fuel system components has not occurred, adjusting operation of the fuel pump to perform a fuel filter cleaning routine. In a first example of the method, adjusting operation of the fuel pump to perform the fuel filter cleaning routine includes performing a plurality of fuel pulse cycles throughout a cycling duration, with the fuel pump and the fuel filter being disposed within a fuel tank. A second example of the method optionally includes the first example, and further includes wherein each fuel pulse cycle of the plurality of fuel pulse cycles includes pulsing fuel through the fuel pump and the fuel filter in the forward direction and, after pulsing fuel through the vehicle fuel pump and the fuel filter in a forward direction, pulsing fuel through the fuel pump and the fuel filter in a reverse direction opposite to the forward direction and away from the fuel rail. A third example of the method optionally includes one or both of the first and second examples, and further includes wherein pulsing the fuel through the fuel pump and the fuel filter in the reverse direction includes providing a negative electrical voltage to the fuel pump. A fourth example of the method optionally includes one or more or each of the first through third examples, and further includes wherein determining whether degradation of any of the plurality of engine fuel system components has occurred includes: operating the fuel pump in a forward direction for a flow duration to flow fuel to the engine fuel rail; and while operating the fuel pump in the forward direction for the flow duration: diagnosing degradation of the fuel injector by adjusting operation of the fuel injector and determining an air/fuel ratio in an exhaust passage of the engine; and diagnosing degradation of the fuel regulator or the fuel line by determining a vapor pressure in a fuel tank while sealing the fuel tank from atmosphere, the fuel regulator and the fuel pump and the fuel line each positioned within the fuel tank. A fifth example of the method optionally includes one or more or each of the first through fourth examples, and further includes wherein operating the fuel pump in the forward direction includes providing a positive electrical voltage to the fuel pump. A sixth example of the method optionally includes one or more or each of the first through fifth examples, and further includes wherein adjusting operation of the fuel injector includes fully closing a nozzle of the fuel injector throughout the duration and not opening the nozzle throughout the duration. A seventh example of the method optionally includes one or more or each of the first through sixth examples, and further includes wherein determining the vapor pressure in the fuel tank includes measuring the vapor pressure via a vapor pressure sensor coupled to the fuel tank. An eighth example of the method optionally includes one or more or each of the first through seventh examples, and further includes wherein sealing the fuel tank from atmosphere includes moving a fuel tank isolation valve to a fully closed position. A ninth example of the method optionally includes one or more or each of the first through eighth examples, and further includes wherein determining the air/fuel ratio includes measuring the air/fuel ratio via one or more sensors coupled to the exhaust passage. A fifth example of the method optionally includes one or more or each of the first through fourth examples, and further includes wherein measuring the air/fuel ratio via the one or more sensors includes measuring an amount of oxygen in the exhaust passage via a heated exhaust gas oxygen sensor.

In another embodiment, a method comprises: operating an engine of a vehicle for a first duration and comparing a pressure of fuel in an engine fuel rail to a threshold pressure throughout the entire first duration; and responsive to both of the pressure of fuel in the engine fuel rail decreasing below the threshold pressure at least once during the first duration and an engine key-off request: running the engine unfueled for a second duration while monitoring an air/fuel ratio in an exhaust passage coupled to the engine throughout the entire second duration; sealing an engine evaporative emissions system coupled to a fuel tank of the vehicle and monitoring a fuel vapor pressure within the fuel tank for a third duration; and adjusting operation of a fuel pump coupled between the fuel tank and the fuel rail responsive to both of the air/fuel ratio and the fuel vapor pressure. In a first example of the method, the method includes wherein adjusting operation of the fuel pump responsive to both of the air/fuel ratio and the fuel vapor pressure includes stopping a flow of fuel through the fuel pump while the air/fuel ratio is less than a threshold air/fuel ratio or the fuel vapor pressure is greater than a threshold fuel vapor pressure. A second example of the method optionally includes the first example, and further includes wherein adjusting operation of the fuel pump responsive to both of the air/fuel ratio and the fuel vapor pressure includes, in response to the air/fuel ratio being greater than a threshold air/fuel ratio for the entire second duration and the fuel vapor pressure being less than a threshold fuel vapor pressure for the entire third duration, pumping fuel in a reverse direction of the fuel pump through a fuel filter. A third example of the method optionally includes one or both of the first and second examples, and further includes wherein pumping fuel in the reverse direction of the fuel pump includes flowing fuel from an outlet of the fuel pump to an inlet of the fuel pump, the outlet fluidly coupling the fuel pump to the engine fuel rail via a fuel line, the inlet fluidly coupling the fuel pump to the fuel filter and fuel stored within the fuel tank. A fourth example of the method optionally includes one or more or each of the first through third examples, and further includes wherein pumping the fuel in the reverse direction of the fuel pump through the fuel filter occurs during each pulse of a plurality of pulses of fuel through the fuel pump and the fuel filter. A fifth example of the method optionally includes one or more or each of the first through fourth examples, and further includes wherein each pulse of the plurality of pulses further includes pumping fuel in a forward direction of the fuel pump opposite to the reverse direction, before pumping fuel in the reverse direction.

In one embodiment, a system comprises: an engine; a fuel rail including a plurality of fuel injectors coupled to cylinders of the engine; a fuel tank having a fuel pump and a fuel filter disposed therein, the fuel pump fluidly coupled to the fuel rail; a plurality of fuel tank pressurized components consisting of a fuel pressure regulator and one or more fuel lines disposed within the fuel tank; and an electronic controller including first computer readable instructions stored on non-transitory memory that when executed cause the controller to: determine whether a fuel rail pressure is less than a threshold fuel rail pressure before an engine key-off request and while the engine is running and combusting fuel/air; and after the engine key-off request and before an engine key-on request with no other engine key-on requests therebetween, in response to the fuel rail pressure being less than the threshold fuel rail pressure: determine whether degradation of one or more fuel injectors of the plurality of fuel injectors has occurred; determine whether degradation of any of the plurality of fuel tank pressurized components has occurred; and in response to determining that degradation of the one or more fuel injectors has not occurred and degradation of any of the plurality of fuel tank pressurized components has not occurred, performing a fuel filter cleaning routine. In a first example of the system, the system further comprises an electrical circuit coupling the fuel pump to a power source, the electrical circuit including a first set of switches coupled to a first voltage input and a second set of switches coupled to a second voltage input, and further comprising second computer readable instructions stored on the non-transitory memory that when executed cause the controller to: while performing the fuel filter cleaning routine, provide a plurality of pulses of fuel through the fuel pump, where each pulse of the plurality of pulses includes flowing fuel in a forward direction of the fuel pump and then flowing fuel in a reverse direction of the fuel pump, where flowing fuel in the forward direction includes opening the first set of switches and closing the second set of switches in order to flow electrical current through the fuel pump in a first direction, and where flowing fuel in the reverse direction includes closing the first set of switches and opening the second set of switches in order to flow electrical current through the fuel pump in an opposite, second direction. A second example of the system optionally includes the first example, and further includes a first check valve and a second check valve fluidly coupled in parallel to an outlet of the fuel pump downstream of the outlet and upstream of the fuel pressure regulator, the first check valve adjustable to a fully opened position in response to a fuel flow from the fuel pump in a forward direction of the fuel pump and not adjustable to the fully opened position in response to a fuel flow from the fuel pump in a reverse direction of the fuel pump, and the second check valve adjustable to a fully opened position in response to the fuel flow from the fuel pump in the reverse direction of the fuel pump and not adjustable to the fully opened position in response to the fuel flow from the fuel pump in the forward direction of the fuel pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
 responsive to an engine fuel rail pressure decreasing below a threshold pressure, determining degradation of any of a plurality of engine fuel system components including a fuel injector, a fuel regulator, and a fuel line coupled to a fuel pump;
 if the determining of degradation determines degradation of any of the plurality of engine fuel system components has occurred, indicating the degradation without performing a fuel filter cleaning routine;
 if the determining of degradation does not determine degradation of any of the plurality of engine fuel system components has occurred, then adjusting operation of the fuel pump to perform the fuel filter cleaning routine, and following performance of the fuel filter cleaning routine, responsive to the engine fuel rail pressure remaining below the threshold pressure, indicating fuel system degradation.

2. The method of claim 1, wherein adjusting operation of the fuel pump to perform the fuel filter cleaning routine includes performing a plurality of fuel pulse cycles throughout a cycling duration, with the fuel pump and the fuel filter being disposed within a fuel tank.

3. The method of claim 2, wherein each fuel pulse cycle of the plurality of fuel pulse cycles includes pulsing fuel through the fuel pump and the fuel filter in a forward direction and, after pulsing fuel through the vehicle fuel pump and the fuel filter in the forward direction, pulsing fuel through the fuel pump and the fuel filter in a reverse direction opposite to the forward direction and away from a fuel rail.

4. The method of claim 3, wherein pulsing the fuel through the fuel pump and the fuel filter in the reverse direction includes providing a negative electrical voltage to the fuel pump.

5. The method of claim 1, wherein determining whether degradation of any of the plurality of engine fuel system components has occurred includes:
 operating the fuel pump in a forward direction for a flow duration to flow fuel to the engine fuel rail; and
 while operating the fuel pump in the forward direction for the flow duration:
  diagnosing degradation of the fuel injector by adjusting operation of the fuel injector and determining an air/fuel ratio in an exhaust passage of the engine; and
  diagnosing degradation of the fuel regulator or the fuel line by determining a vapor pressure in a fuel tank while sealing the fuel tank from atmosphere, the fuel regulator and the fuel pump and the fuel line each positioned within the fuel tank.

6. The method of claim 5, wherein operating the fuel pump in the forward direction includes providing a positive electrical voltage to the fuel pump.

7. The method of claim 5, wherein adjusting operation of the fuel injector includes fully closing a nozzle of the fuel injector throughout the duration and not opening the nozzle throughout the duration.

8. The method of claim 5, wherein determining the vapor pressure in the fuel tank includes measuring the vapor pressure via a vapor pressure sensor coupled to the fuel tank.

9. The method of claim 5, wherein sealing the fuel tank from atmosphere includes moving a fuel tank isolation valve to a fully closed position.

10. The method of claim 5, wherein determining the air/fuel ratio includes measuring the air/fuel ratio via one or more sensors coupled to the exhaust passage.

11. The method of claim 10, wherein measuring the air/fuel ratio via the one or more sensors includes measuring an amount of oxygen in the exhaust passage via a heated exhaust gas oxygen sensor.

12. A method, comprising:
operating an engine of a vehicle for a first duration and comparing a pressure of fuel in an engine fuel rail to a threshold pressure throughout the first duration; and
responsive to both of the pressure of fuel in the engine fuel rail decreasing below the threshold pressure at least once during the first duration and an engine key-off request:
running the engine unfueled for a second duration while monitoring an air/fuel ratio in an exhaust passage coupled to the engine throughout the second duration;
sealing an engine evaporative emissions system coupled to a fuel tank of the vehicle and monitoring a fuel vapor pressure within the fuel tank for a third duration; and
adjusting operation of a fuel pump coupled between the fuel tank and the fuel rail responsive to both of the air/fuel ratio and the fuel vapor pressure, wherein
in response to the air/fuel ratio being less than a threshold air/fuel ratio or the fuel vapor pressure being greater than a threshold fuel vapor pressure, stopping a flow of fuel through the fuel pump; and
in response to the air/fuel ratio being greater than a threshold air/fuel ratio for the second duration and the fuel vapor pressure being less than a threshold fuel vapor pressure for the third duration, pumping fuel in a reverse direction of the fuel pump through a fuel filter.

13. The method of claim 12, wherein pumping fuel in the reverse direction of the fuel pump includes flowing fuel from an outlet of the fuel pump to an inlet of the fuel pump, the outlet fluidly coupling the fuel pump to the engine fuel rail via a fuel line, the inlet fluidly coupling the fuel pump to the fuel filter and fuel stored within the fuel tank.

14. The method of claim 12, wherein pumping the fuel in the reverse direction of the fuel pump through the fuel filter occurs during each pulse of a plurality of pulses of fuel through the fuel pump and the fuel filter.

15. The method of claim 14, wherein each pulse of the plurality of pulses further includes pumping fuel in a forward direction of the fuel pump opposite to the reverse direction, before pumping fuel in the reverse direction.

16. A system, comprising:
an engine;
a fuel rail including a plurality of fuel injectors coupled to cylinders of the engine;
a fuel tank having a fuel pump and a fuel filter disposed therein, the fuel pump fluidly coupled to the fuel rail;
a plurality of fuel tank pressurized components consisting of a fuel pressure regulator and one or more fuel lines disposed within the fuel tank; and
an electronic controller including first computer readable instructions stored on non-transitory memory that when executed cause the controller to:
determine whether a fuel rail pressure is less than a threshold fuel rail pressure before an engine key-off request and while the engine is running and combusting fuel/air; and
after the engine key-off request and before an engine key-on request with no other engine key-on requests therebetween, in response to the fuel rail pressure being less than the threshold fuel rail pressure:
determine whether degradation of one or more fuel injectors of the plurality of fuel injectors has occurred;
determine whether degradation of any of the plurality of fuel tank pressurized components has occurred;
in response to determining that degradation of the one or more fuel injectors or any of the plurality of fuel tank pressurized components has occurred, indicating degradation of a fuel system component without performing a fuel filter cleaning routine; and
in response to determining that degradation of the one or more fuel injectors has not occurred and degradation of any of the plurality of fuel tank pressurized components has not occurred, performing the fuel filter cleaning routine.

17. The system of claim 16, further comprising an electrical circuit coupling the fuel pump to a power source, the electrical circuit including a first set of switches coupled to a first voltage input and a second set of switches coupled to a second voltage input, and further comprising second computer readable instructions stored on the non-transitory memory that when executed cause the controller to:
while performing the fuel filter cleaning routine, provide a plurality of pulses of fuel through the fuel pump, where each pulse of the plurality of pulses includes flowing fuel in a forward direction of the fuel pump and then flowing fuel in a reverse direction of the fuel pump, where flowing fuel in the forward direction includes opening the first set of switches and closing the second set of switches in order to flow electrical current through the fuel pump in a first direction, and where flowing fuel in the reverse direction includes closing the first set of switches and opening the second set of switches in order to flow electrical current through the fuel pump in an opposite, second direction.

18. The system of claim 17, further comprising a first check valve and a second check valve fluidly coupled in parallel to an outlet of the fuel pump downstream of the outlet and upstream of the fuel pressure regulator, the first check valve adjustable to a fully opened position in response to a fuel flow from the fuel pump in a forward direction of the fuel pump and not adjustable to the fully opened position in response to a fuel flow from the fuel pump in a reverse direction of the fuel pump, and the second check valve adjustable to a fully opened position in response to the fuel flow from the fuel pump in the reverse direction of the fuel pump and not adjustable to the fully opened position in response to the fuel flow from the fuel pump in the forward direction of the fuel pump.

* * * * *